Oct. 7, 1941.    N. W. LYON    2,258,185
BOTTLE HOODING MACHINE
Filed April 21, 1939    21 Sheets-Sheet 1

Fig. 1.

INVENTOR
NORMAN W. LYON
BY
Chapin + Neal
ATTORNEYS

Oct. 7, 1941.  N. W. LYON  2,258,185
BOTTLE HOODING MACHINE
Filed April 21, 1939  21 Sheets-Sheet 3

INVENTOR
NORMAN W. LYON
BY
Chapin + Neal
ATTORNEYS

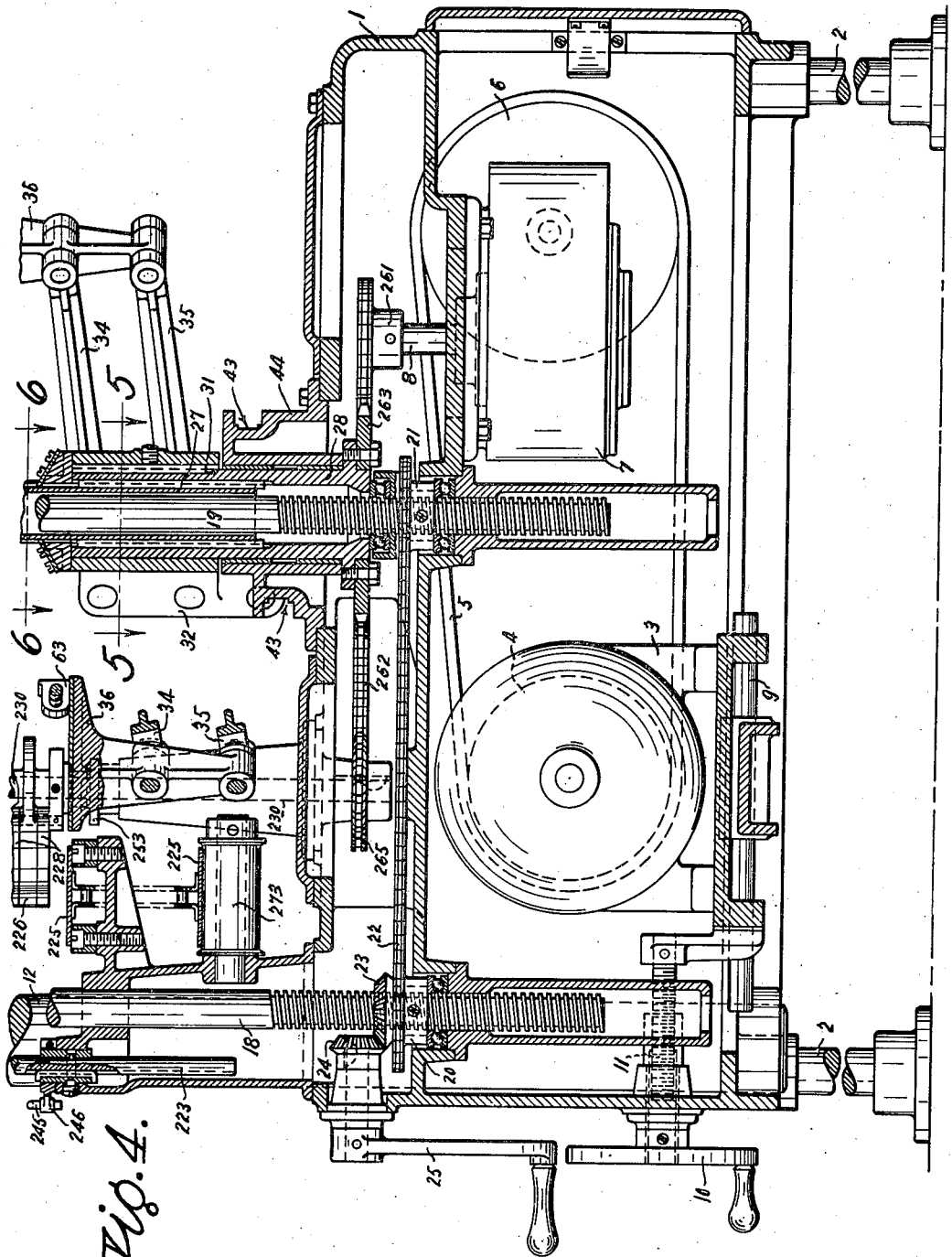

Oct. 7, 1941.                N. W. LYON                 2,258,185
                        BOTTLE HOODING MACHINE
              Filed April 21, 1939          21 Sheets—Sheet 5
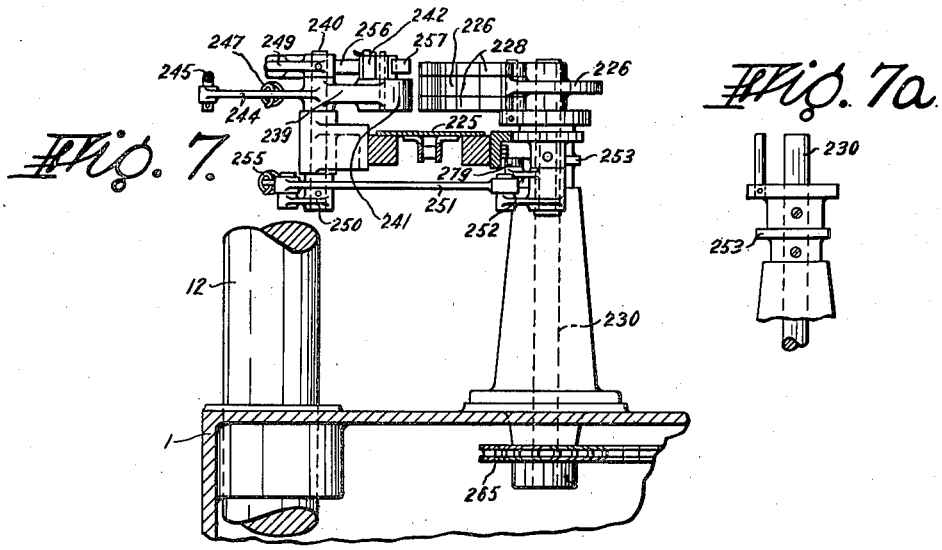
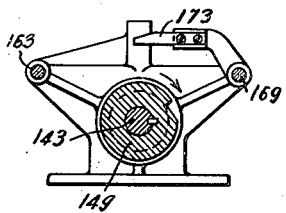
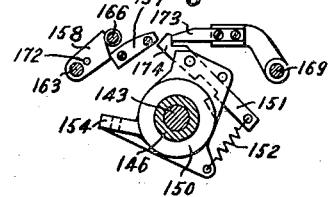
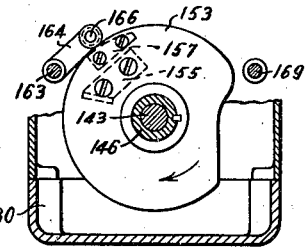
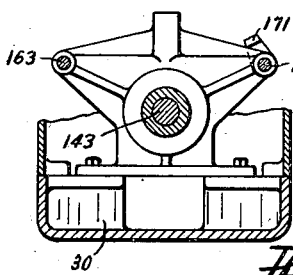
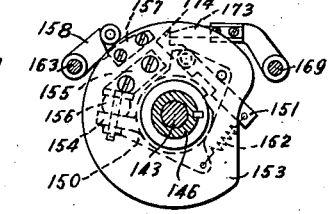
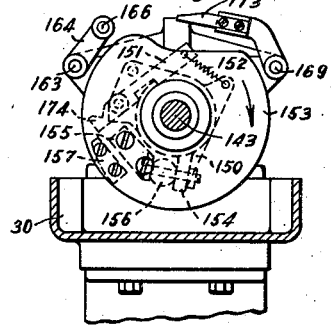
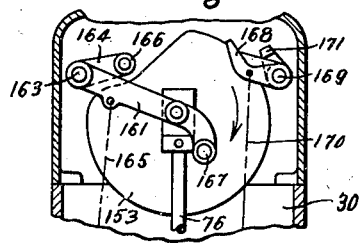
INVENTOR
*Norman W. Lyon*
BY
*Chapin + Neal*
ATTORNEYS

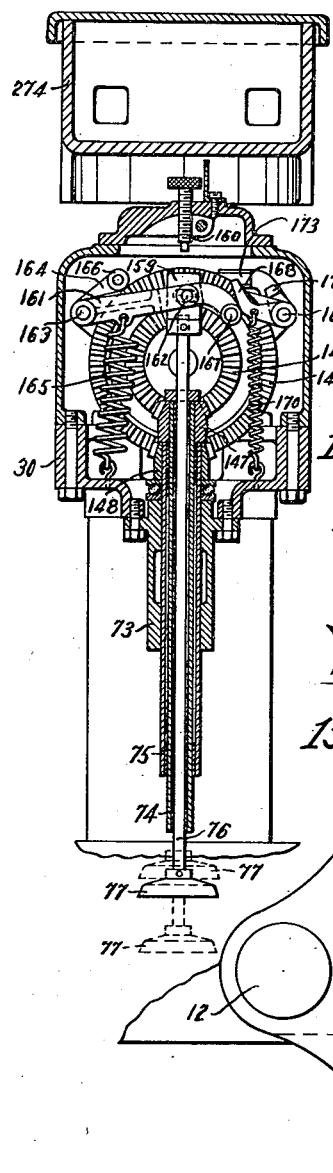

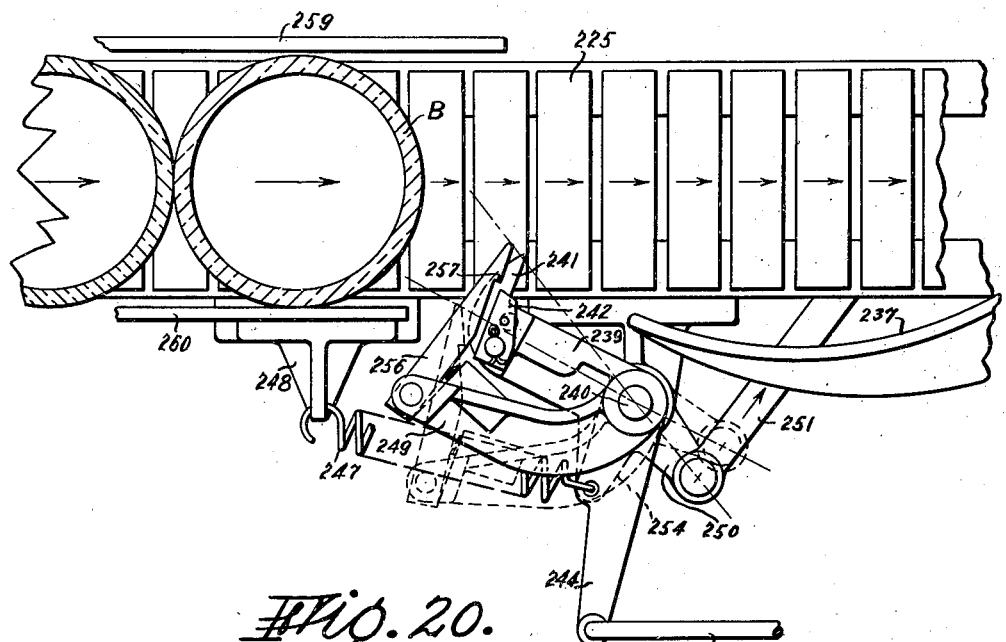
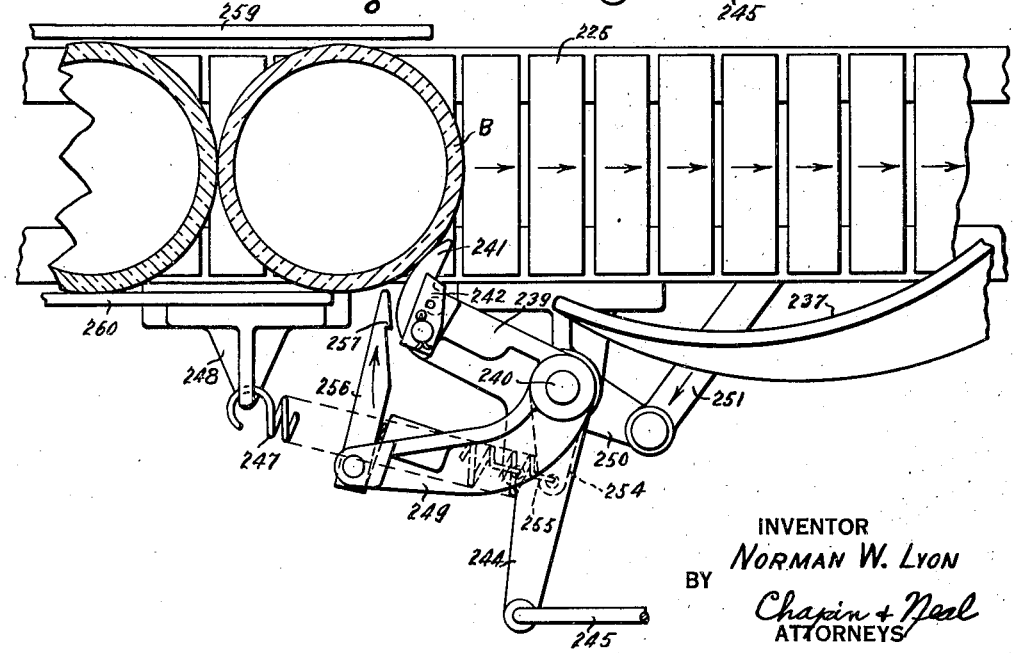

Oct. 7, 1941.    N. W. LYON    2,258,185
BOTTLE HOODING MACHINE
Filed April 21, 1939    21 Sheets-Sheet 8

INVENTOR
NORMAN W. LYON
BY
Chapin + Neal
ATTORNEYS

Oct. 7, 1941.　　　N. W. LYON　　　2,258,185
BOTTLE HOODING MACHINE
Filed April 21, 1939　　　21 Sheets-Sheet 9
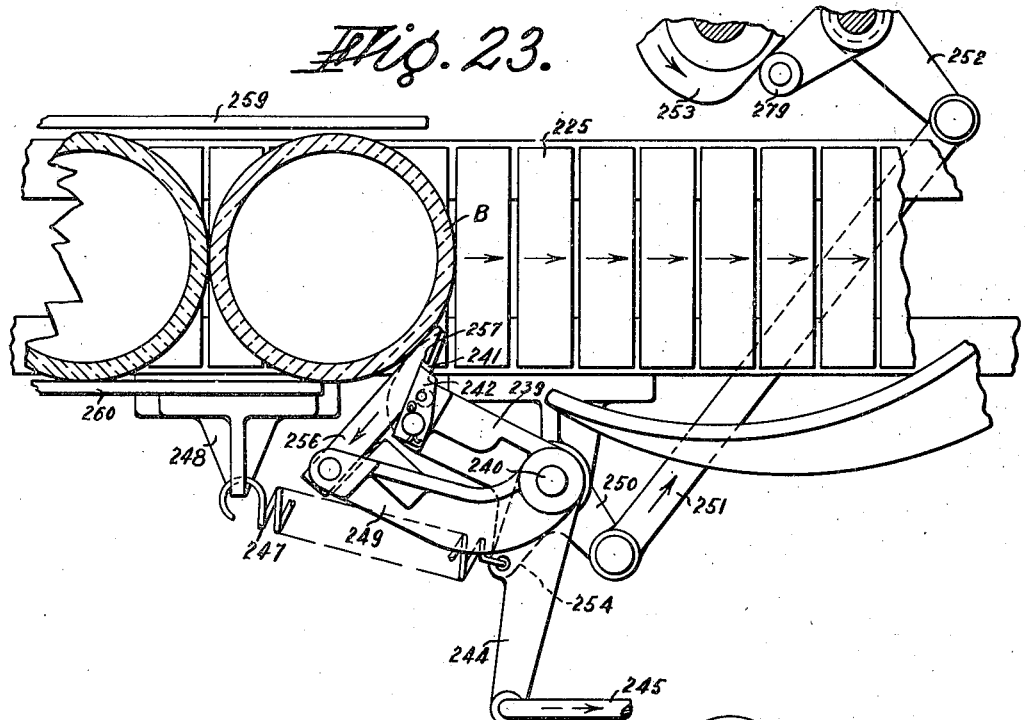
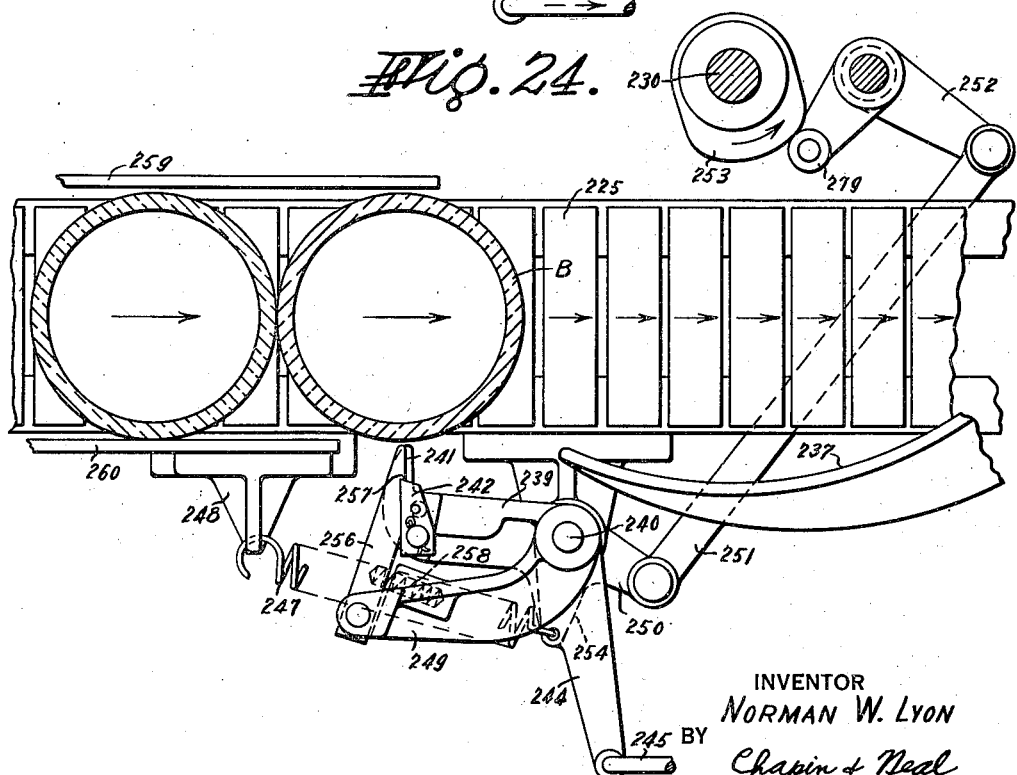
INVENTOR
NORMAN W. LYON
BY
Chapin & Neal
ATTORNEYS

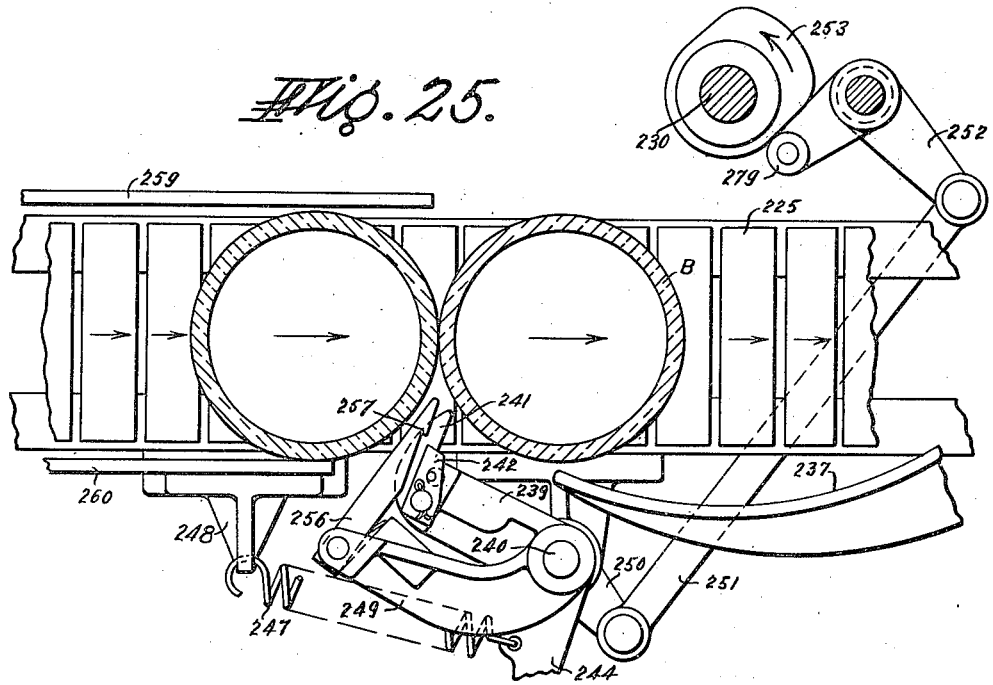
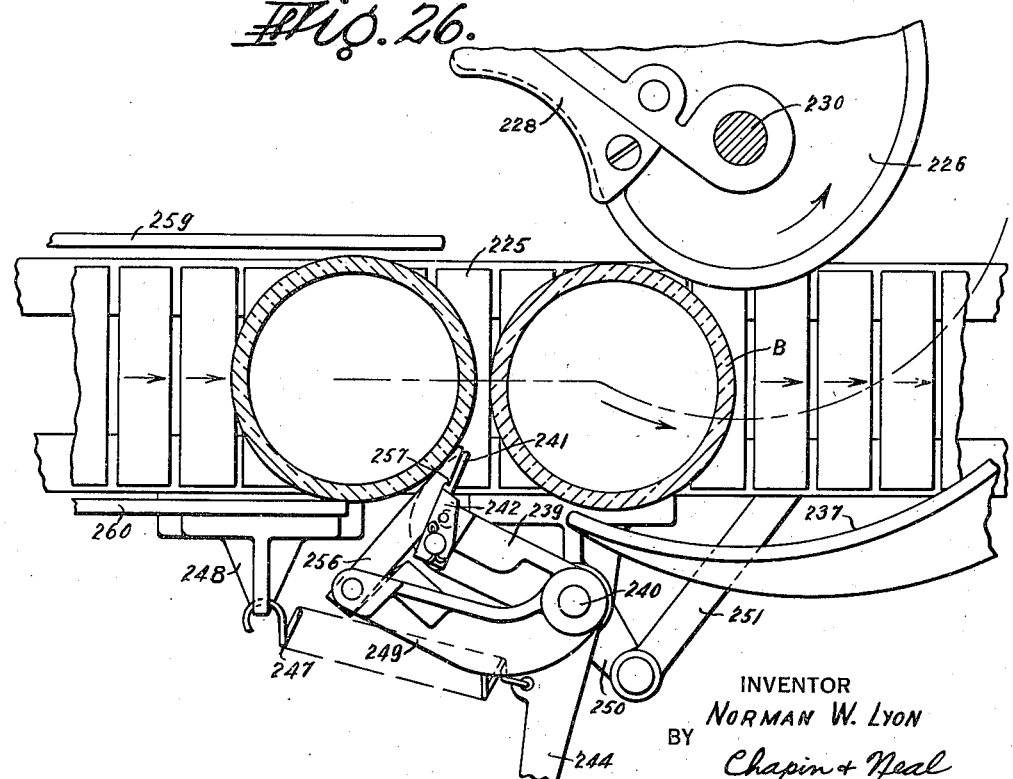

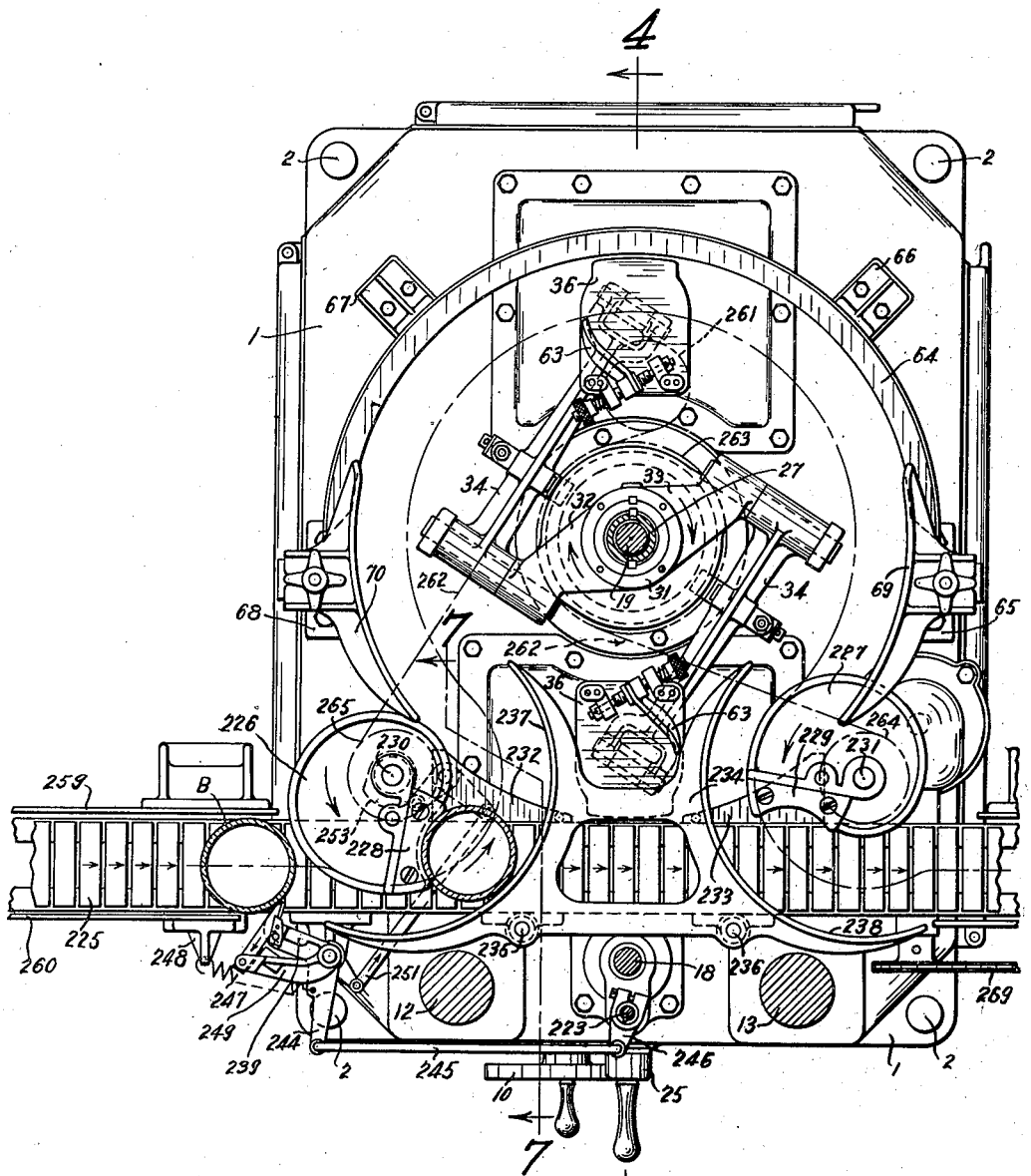

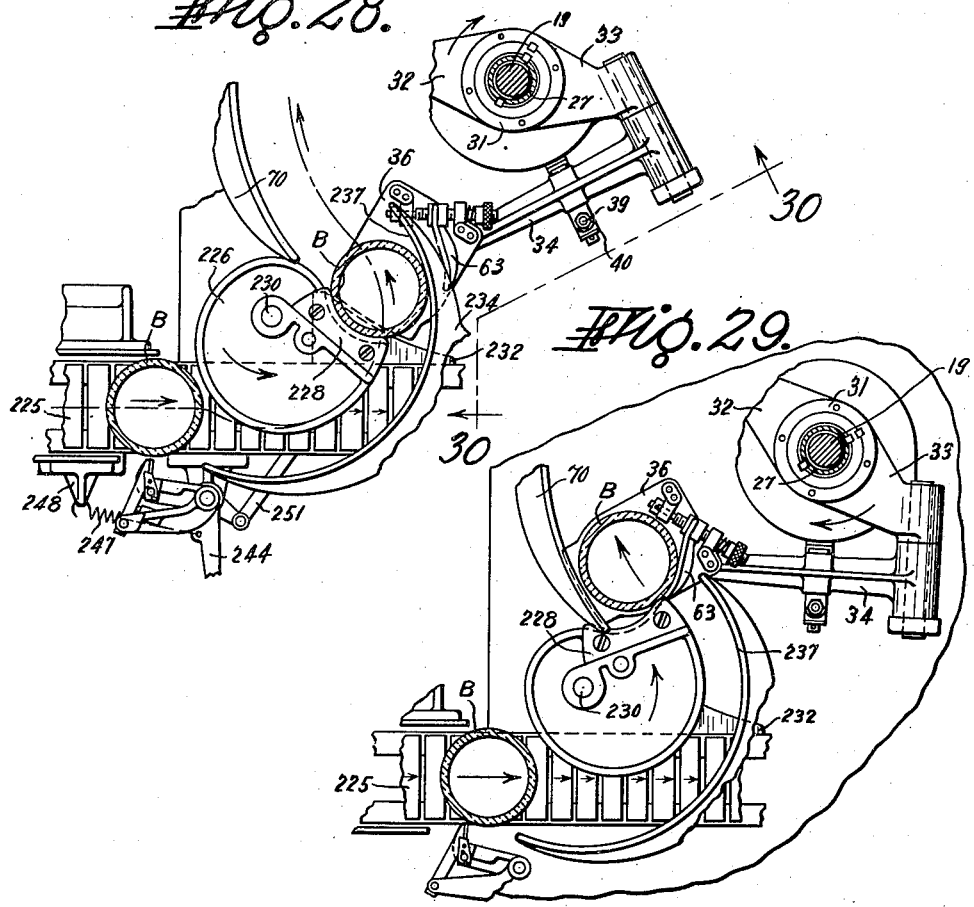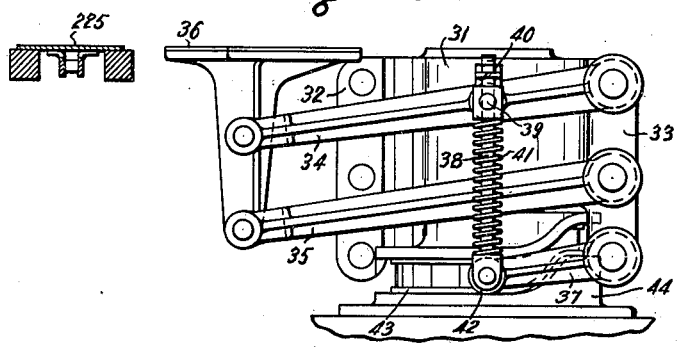

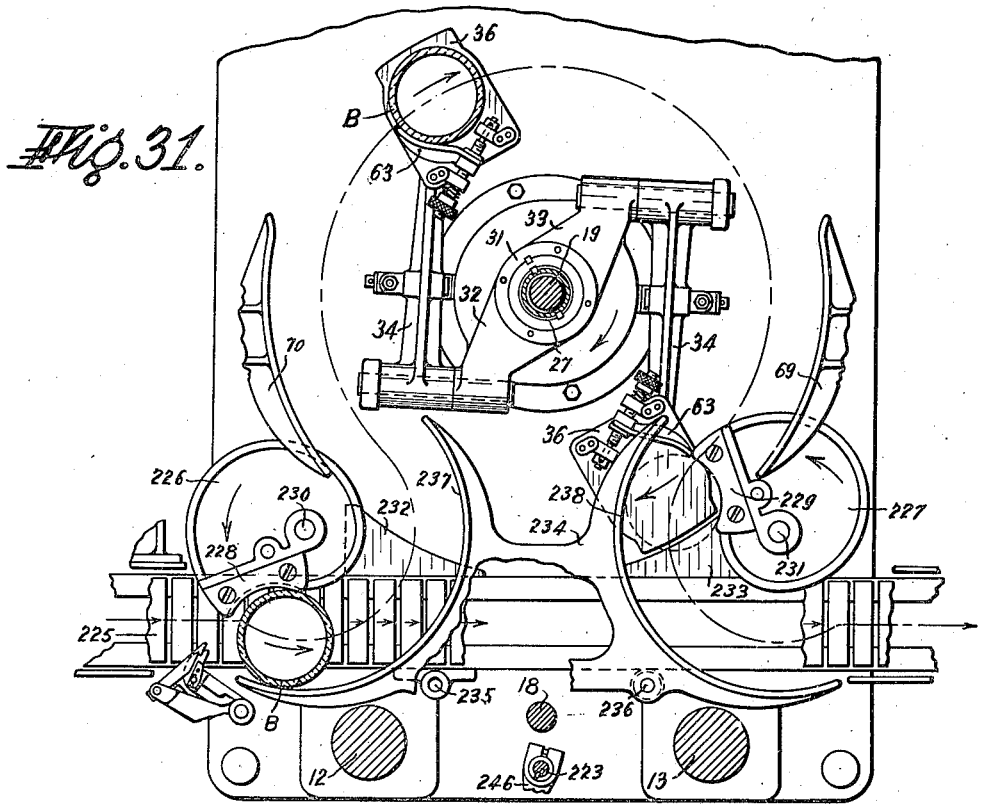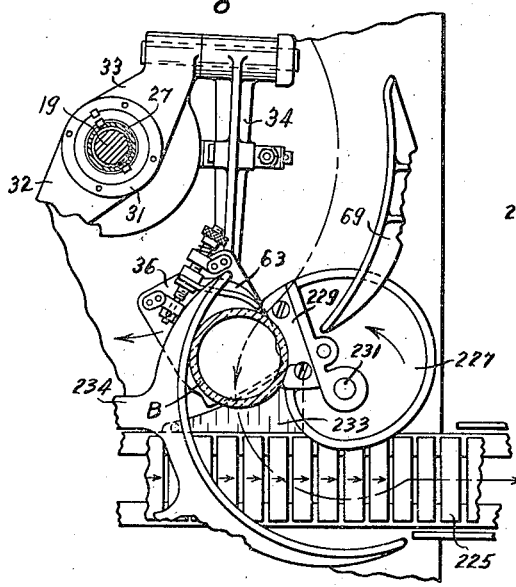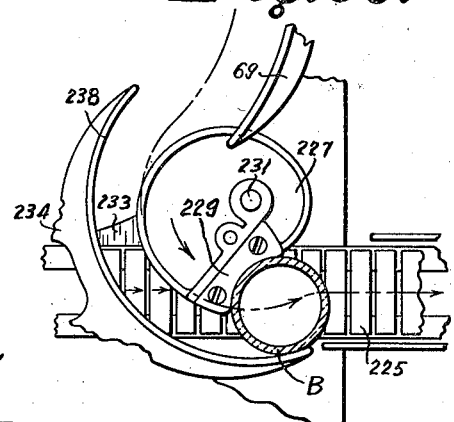

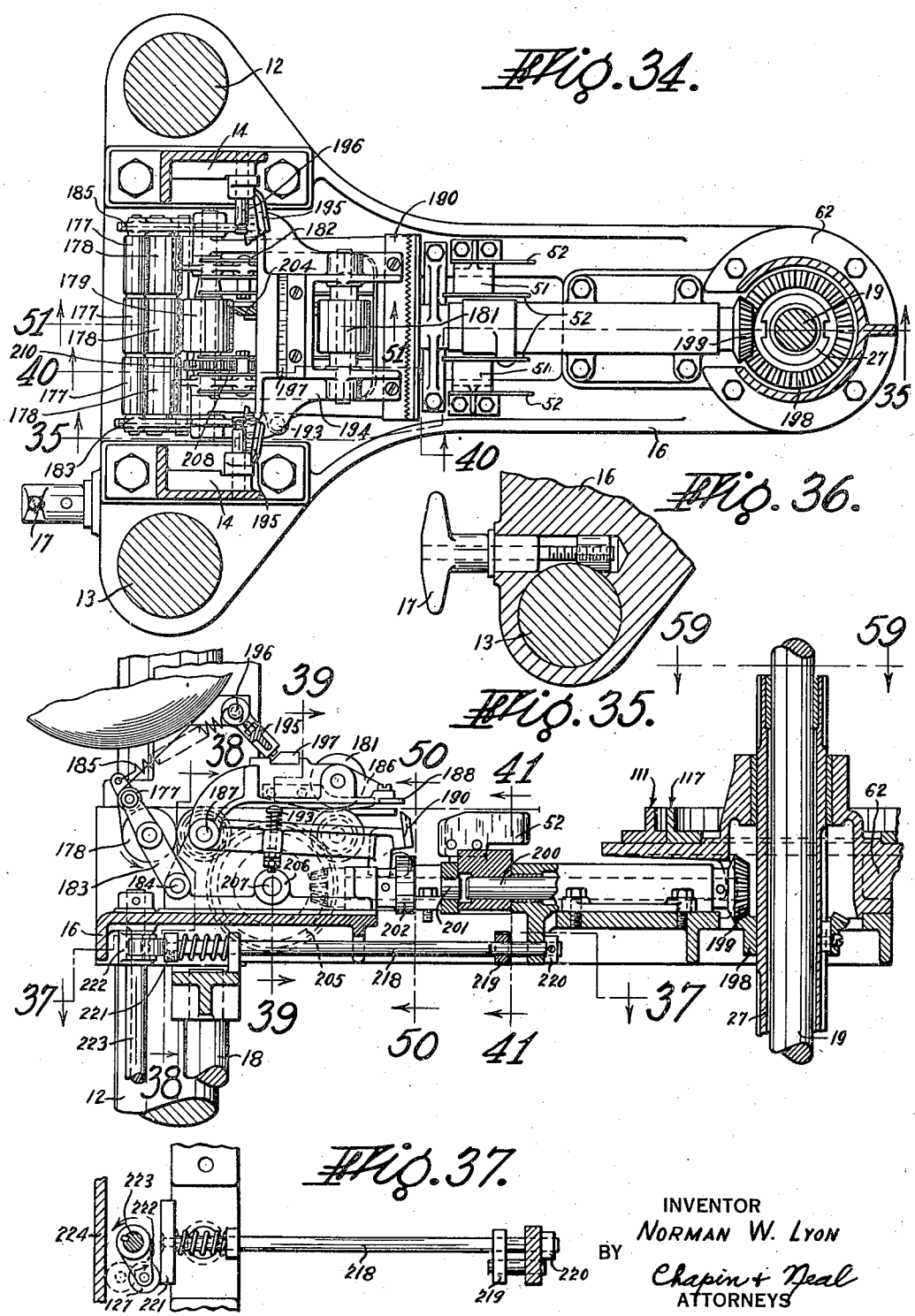

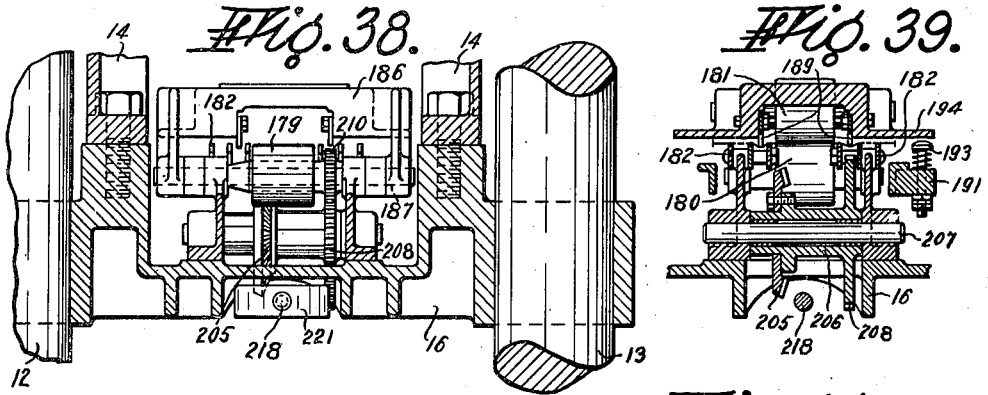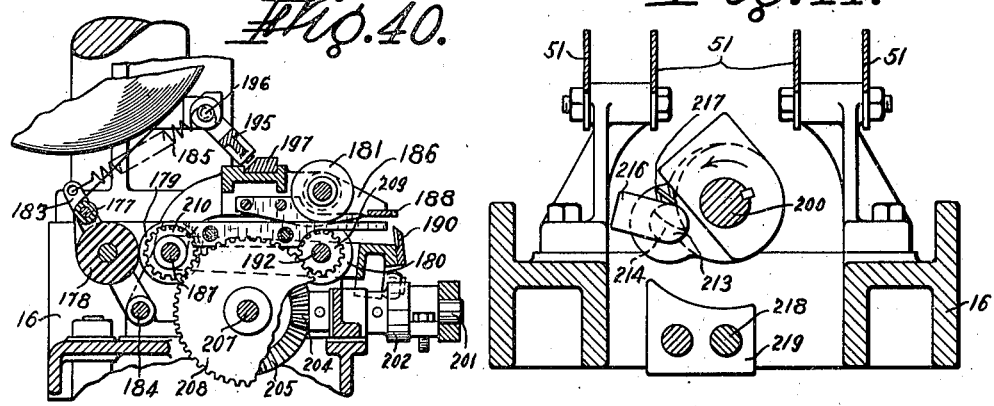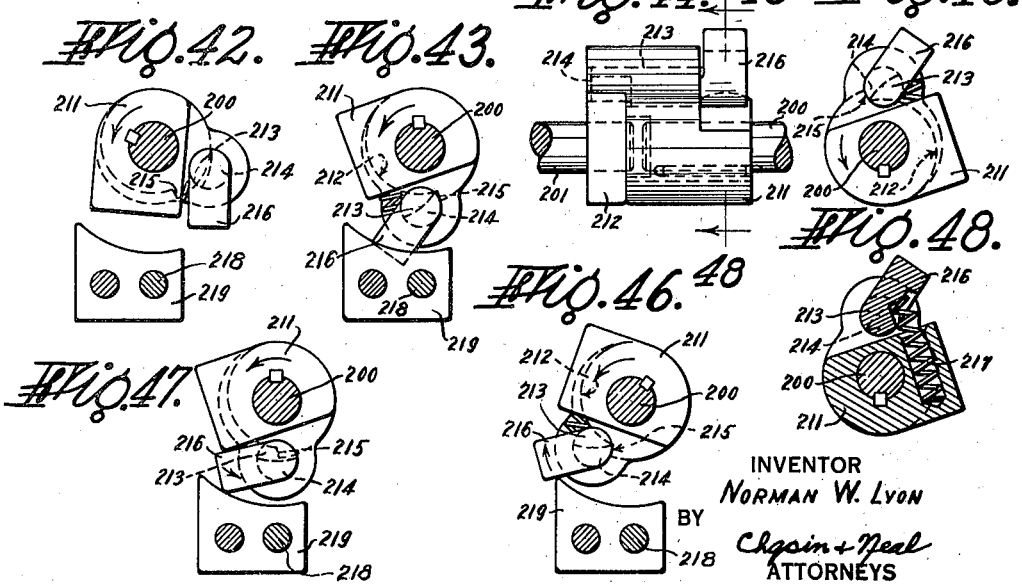

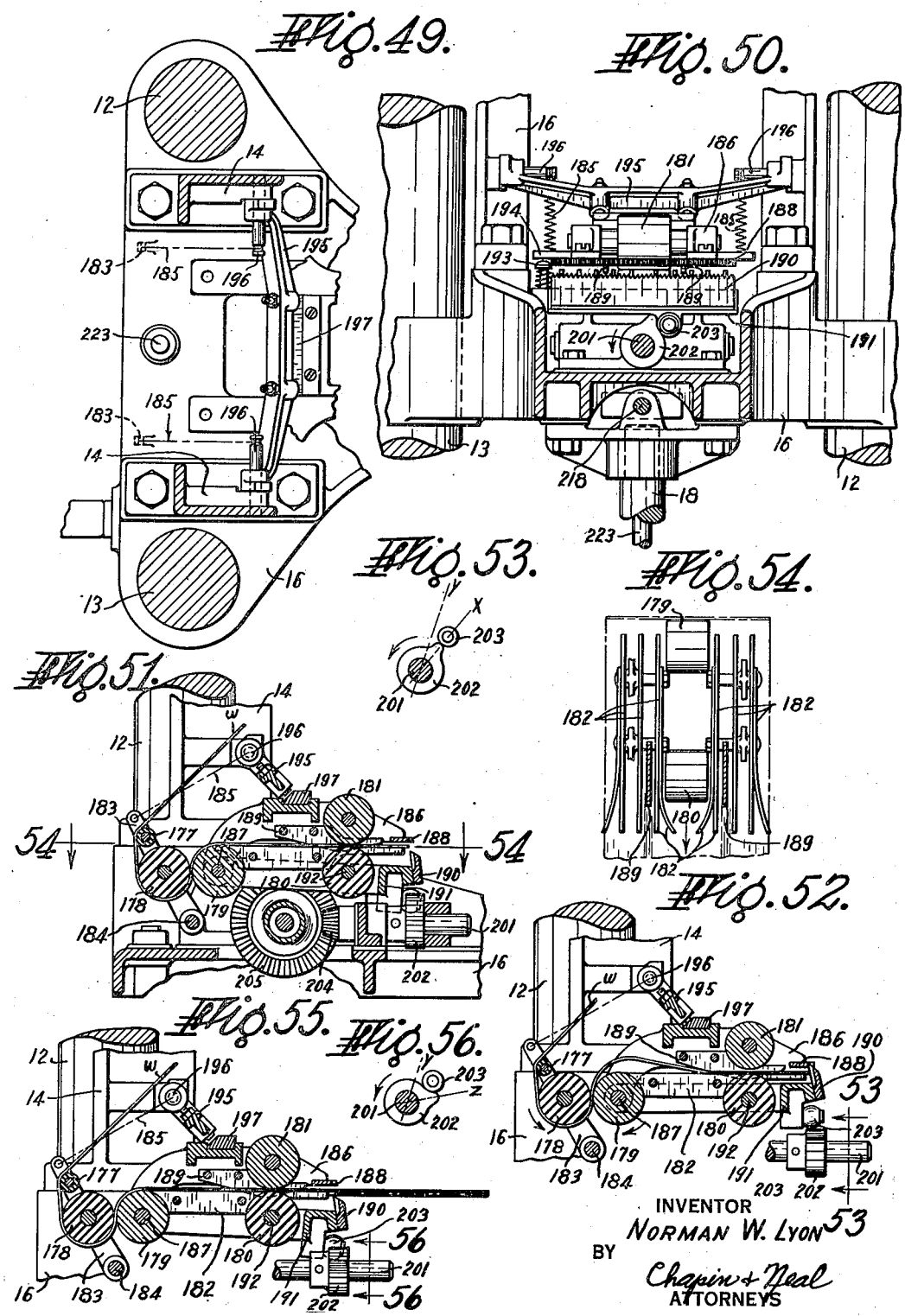

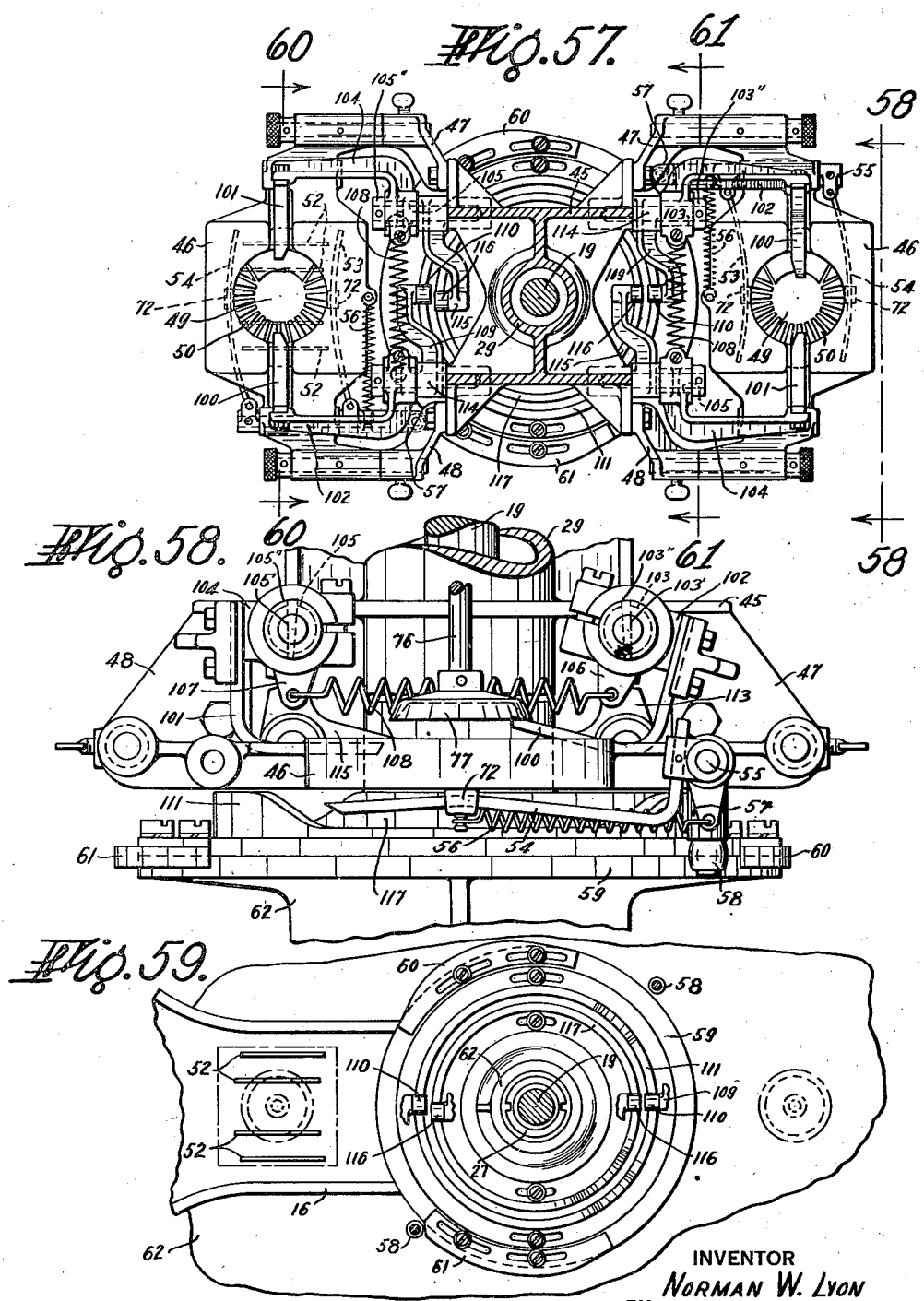

Oct. 7, 1941.   N. W. LYON   2,258,185
BOTTLE HOODING MACHINE
Filed April 21, 1939   21 Sheets-Sheet 18
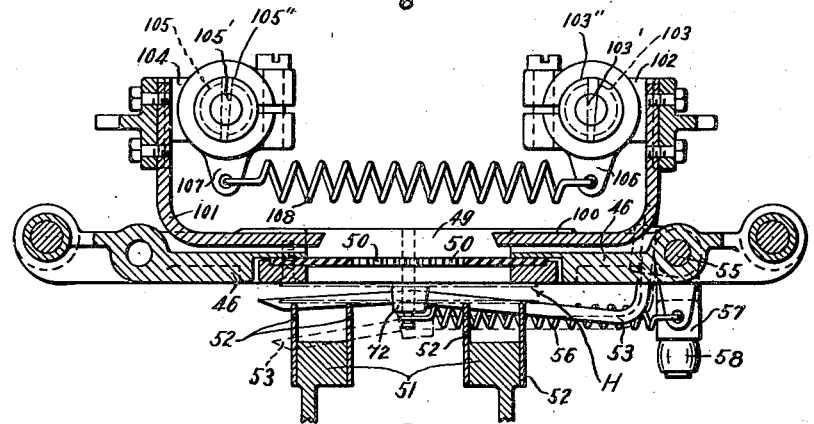
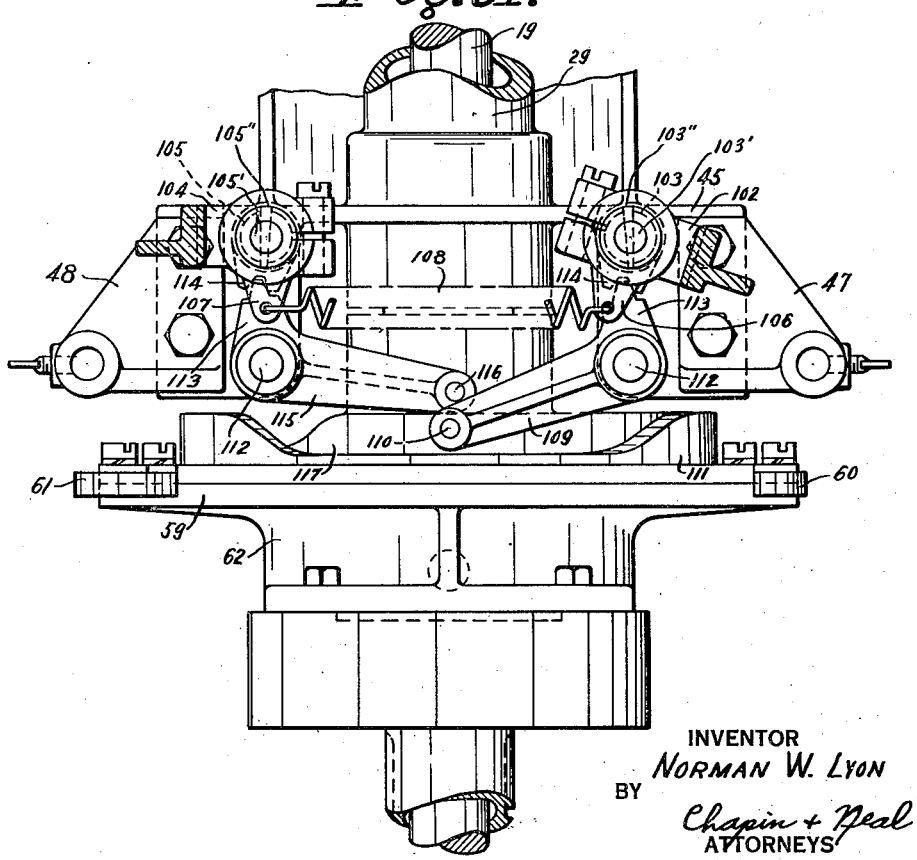
INVENTOR
NORMAN W. LYON
BY
Chapin + Neal
ATTORNEYS

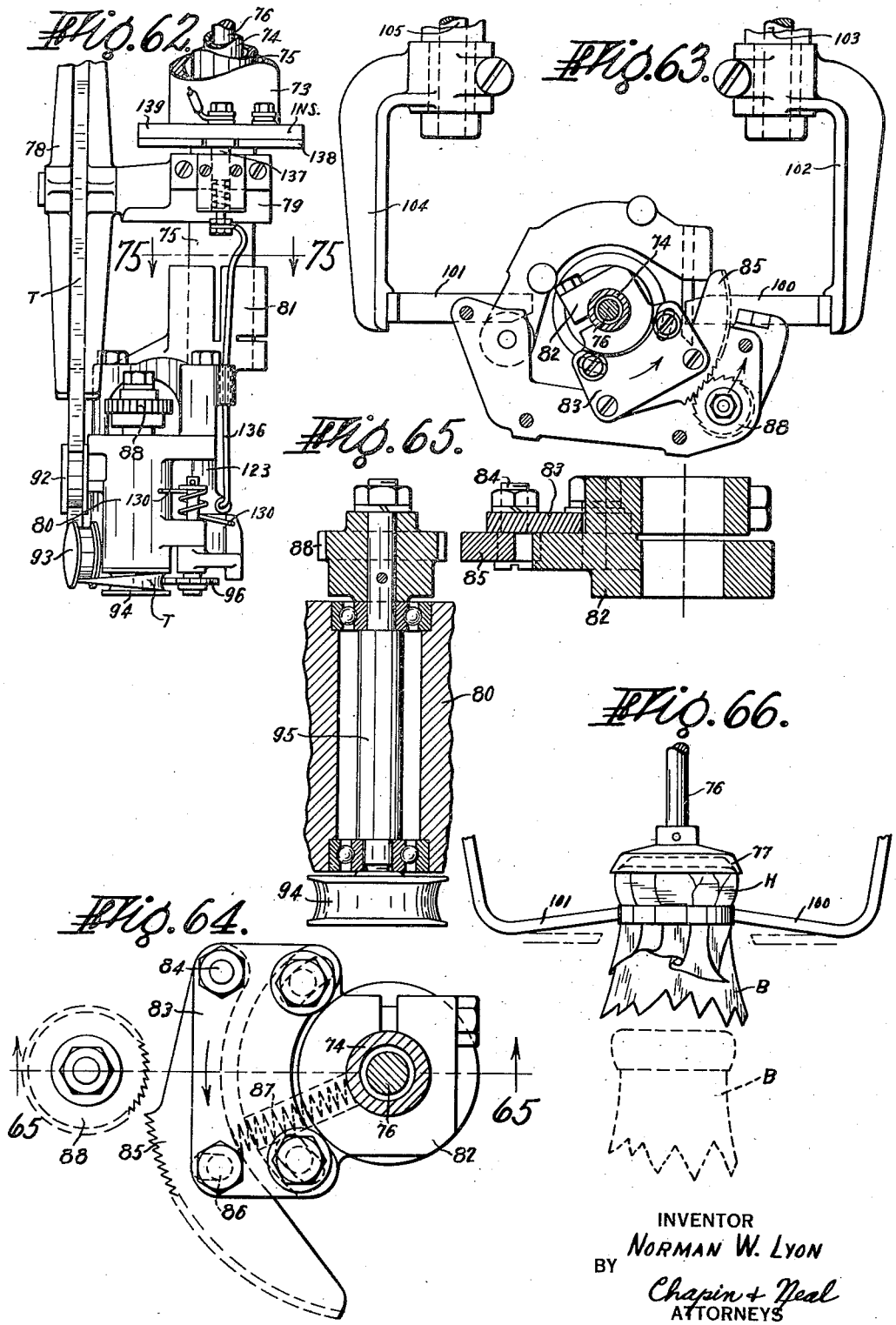

Oct. 7, 1941.    N. W. LYON    2,258,185
BOTTLE HOODING MACHINE
Filed April 21, 1939    21 Sheets-Sheet 20

INVENTOR
NORMAN W. LYON
BY
Chapin + Neal
ATTORNEYS

Oct. 7, 1941.   N. W. LYON   2,258,185
BOTTLE HOODING MACHINE
Filed April 21, 1939   21 Sheets-Sheet 21

INVENTOR
NORMAN W. LYON
BY
Chapin + Neal
ATTORNEYS

Patented Oct. 7, 1941

2,258,185

UNITED STATES PATENT OFFICE 2,258,185

BOTTLE HOODING MACHINE

Norman W. Lyon, Springfield, Mass., assignor to Package Machinery Company, Springfield, Mass., a corporation of Massachusetts Application April 12, 1939, Serial No. 267,459

21 Claims. (Cl. 226—83)

This invention relates to improvements in bottle hooding machines of the general character shown and described in my previous applications Serial No. 62,818, filed Feb. 7, 1936, and Serial No. 120,513, filed January 14, 1937.

The improvements made in my former mechanisms are herein embodied in a turret type of machine for greater speed in production wherein a plurality of bottle hooding units (herein shown as two) are carried in a rotating frame for having bottles to be hooded fed thereto and delivered therefrom in their finished condition. Improvements reside in the feeding means for the bottles, in the general construction of the machine, and in certain details of construction of the various parts as will appear.

Fig. 1 is a front elevation of the machine;

Fig. 4 is a similar view showing in vertical section the lower portion of the machine, said section being along line 4—4 of Fig. 27;

Fig. 7 is a detail view partly in vertical section along line 7—7 of Fig. 27;

Fig. 7a is a fragmentary detail at the upper end of the shaft which carries the transfer member, said transfer member being removed;

Fig. 8 is a detail section at line 8—8 of Fig. 3;

Fig. 9 is a detail section at line 9—9 of Fig. 3;

Fig. 10 is a detail section at line 10—10 of Fig. 3;

Fig. 11 is a detail section at line 11—11 of Fig. 3;

Fig. 12 is an explanatory view similar to Fig. 10 showing additional parts in dotted lines;

Fig. 13 is a further explanatory view of parts in Figs. 10 and 12;

Fig. 14 is an explanatory view of the bottle stem and operating cam in bottle ejecting position with respect to the header;

Fig. 15 is a vertical section along line 15—15 of Fig. 16 and shows one of the spindle columns in section;

Fig. 16 is a top view of carrier frame looking down from line 16—16 in Fig. 1, and showing one cover of the turret head removed;

Fig. 17 is a detail section along line 17—17 of Fig. 16;

Fig. 18 is a fragmentary sectional view similar to Fig. 15 showing parts thereof in different position;

Figure 2:
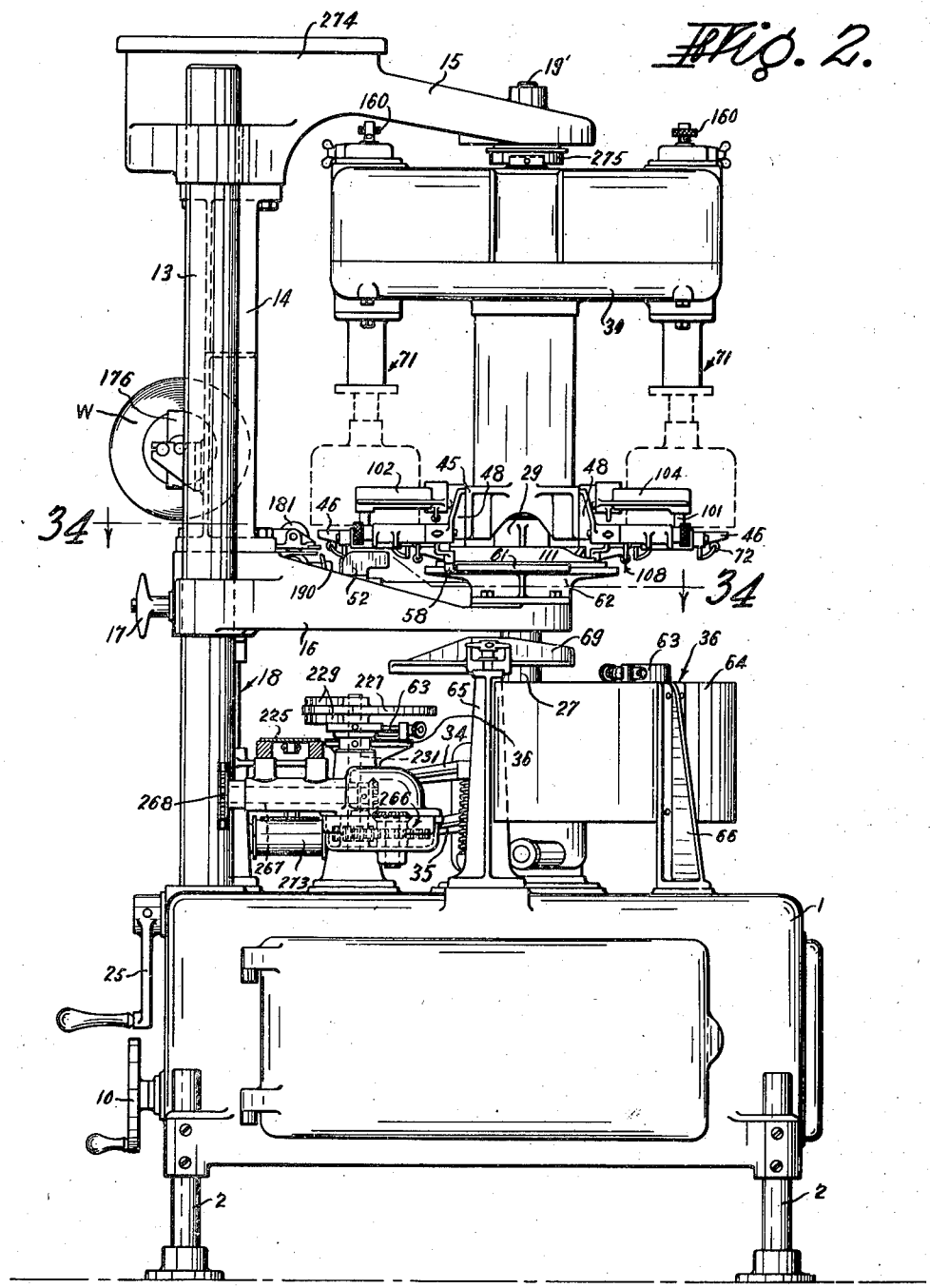
Fig. 2 is a right side elevation of the machine; in this view the tape applicator frame and its appurtenances are indicated diagrammatically by dotted lines circumscribing the area occupied thereby.

Figs. 19 to 26, inclusive, are detail explanatory views of the in-feed part of the bottle conveyor together with the bottle stop, release and detector mechanism in different phase positions of its operation;

Fig. 27 is a horizontal section of the machine along line 27—27 of Fig. 1 and showing lower parts thereof in plan;

Figs. 28 and 29 are detail views from the same section plane as in Fig. 27 and showing different phase positions of the bottle transfer mechanism at the in-feed side of the machine;

Fig. 30 is a detail side view of the bottle elevator as viewed from line 30—30 of Fig. 28;

Fig. 31 is a detail plan view from the same section plane as in Fig. 27 and showing the in-feed and out-feed bottle transfer mechanism;

Figs. 32 and 33 are fragmentary views from Fig. 31 showing different phase positions of said out-feed transfer mechanism;

Fig. 34 is a view generally in horizontal section along line 34—34 of Fig. 2 showing in plan the web feed mechanism;

Fig. 35 is a view, partly in elevation and partly in section, of the parts shown in Fig. 34 and taken generally along section line 35—35 of Fig. 34;

Fig. 36 is a detail section showing the clamping means for holding the carrier frame in adjusted position;

Fig. 37 is a detail section along line 37—37 of Fig. 35;

Fig. 38 is a detail section along line 38—38 of Fig. 35;

Fig. 39 is a detail section along line 39—39 of Fig. 35;

Fig. 40 is a detail section along line 40—40 of Fig. 34;

Fig. 41 is a detail section along line 41—41 of Fig. 35;

Figs. 42 to 48 inclusive are views showing different phase positions of the web feed clutch and throw-out; Figs. 42, 43, 45, 46, and 47 being along the same section as Fig. 41; Fig. 44 being a side view of said clutch; and Fig. 48 a section along line 48—48 of Fig. 44;

Fig. 49 is a fragmentary detail in plan of the carrier frame lower beam which supports the web feed mechanism;

Fig. 50 is a cross sectional view of said lower beam along line 50—50 of Fig. 35 showing a front end view of the web cutting means. This is the rest position of said cutting means when the web feed clutch is disengaged.

Fig. 51 is a detail view in lengthwise section of the web feed mechanism and cutting means along line 51—51 of Fig. 34. This is also the rest position of said parts when the web feed clutch is disengaged.

Fig. 52 is a similar view of said parts showing the cutting means cutting off the web;

Fig. 53 is a sectional detail of the cutter cam along line 53—53 of Fig. 52. The dotted center line $x$ indicates the rest position of said cutter cam as shown in Figs. 50 and 51. The dotted center line $y$ indicates the cutting position of said cam as shown in Fig. 52.

Fig. 54 is a top view in detail of the web guide table as shown by a section along line 54—54 of Fig. 51;

Fig. 55 is a view similar to Fig. 1 with some parts omitted and showing the cutting means about to cut the web;

Fig. 56 is a sectional detail similar to Fig. 53 as shown by a section along line 56—56 of Fig. 55. The cutter cam in moving from dotted center line $y$ to line $x$ closes and opens the cutting means.

Figures 3, 5, 6:
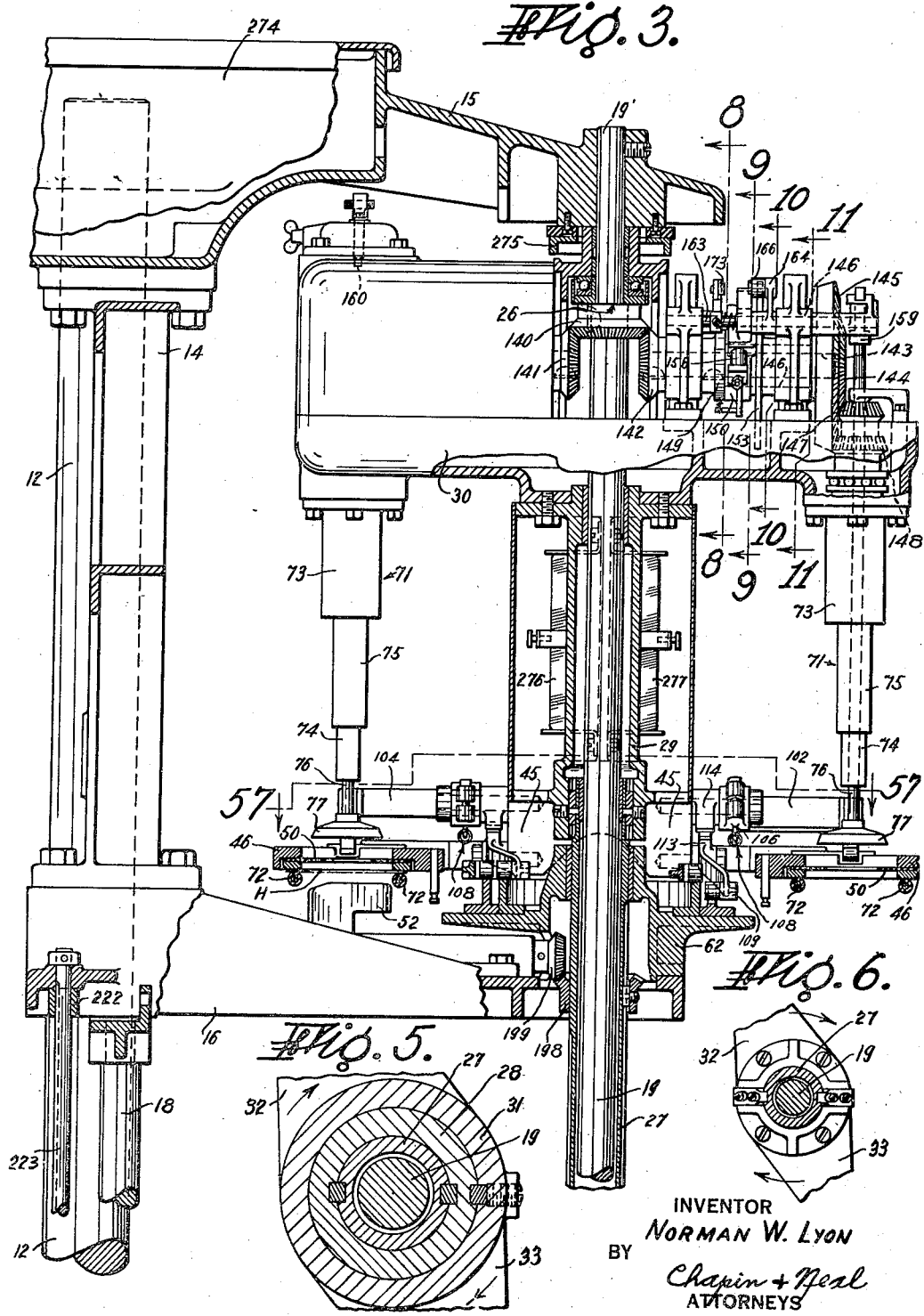
Fig. 3 is a right side view of the upper portion of the machine showing parts thereof in vertical section taken through the axis of the turret.
Fig. 5 is a detail horizontal section at line 5—5 of Fig. 4.
Fig. 6 is a detail horizontal section at line 6—6 of Fig. 4.
Figure 75:
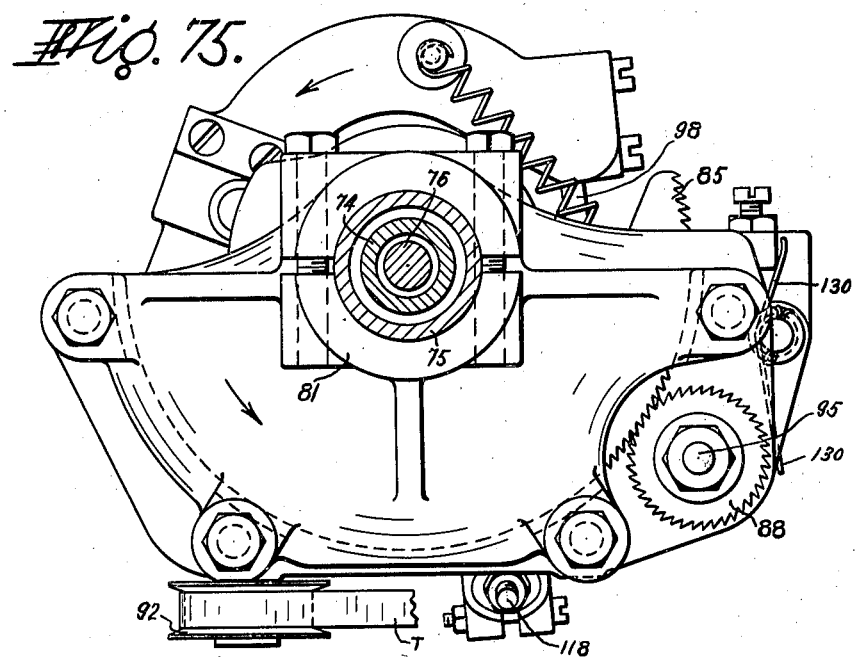
Figure 76:
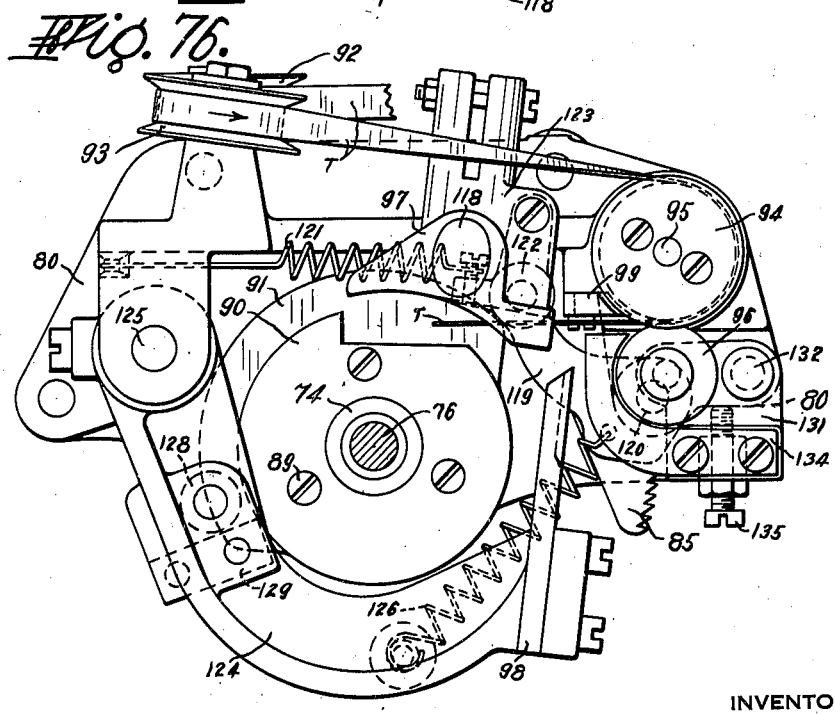

Fig. 57 is a horizontal section of the turret along line 57—57 of Fig. 3 showing in top plan the headers and appurtenances thereof;

Fig. 58 is a right end view of the parts in Fig. 57 as viewed from line 58—58 of Fig. 57;

Fig. 59 is a top plan of the inner end of the lower beam looking down from line 59—59 of Fig. 35 and showing in plan the cam table for the header appurtenances;

Fig. 60 is a sectional view of one of the headers and of the hood blank guide table along line 60—60 of Fig. 57 and looking in the direction of the arrows thereon shown;

Fig. 61 is a sectional view of the other and similar header along line 61—61 of Fig. 57 and looking in the direction of the arrows thereon shown;

Fig. 62 is a detail in elevation of the tape supply and tape applicator mechanism such as is carried at the lower end of each spindle column;

Fig. 63 is a detail showing relative positions at one phase of operation, of the tape clamps, tape feed, intermittent drive, and movable knife cutter for the tape;

Fig. 64 is a fragmentary view of the tape feed intermittent drive, just prior to its engagement;

Fig. 65 is a detail vertical section of the parts in Fig. 64 along line 65—65 of said Fig. 64;

Fig. 66 is an illustrative view of a hooded bottle top—in solid lines in its highest position with the tape clamps and stem cap closed thereon—in dotted lines in its lowest position prior to being raised through the header;

Figs. 67 to 74 inclusive are explanatory views of the tape applying appurtenances in successive phase positions during the rotation of the turret. In these several views the dotted center lines are marked by degrees of angularity to indicate successive rotative positions of the bottle elevator as carried by the turret from the initial or assumed zero position shown in Fig. 27;

Fig. 75 is a top view in plan of the tape applicator frame looking down from section line 75—75 of Fig. 62; and Fig. 76 is a view of said frame looking up at the bottom thereof. The views in Figs. 75 and 76 are enlarged to full size.

We will first describe the general construction and functional operation of the machine and then describe more particularly the detail parts thereof. The machine is of the turret type and has a conveyor for automatically feeding bottles to be hooded into the machine and after being hooded to feed the same out of the machine. The construction of the machine is such that the mechanisms for the in-feed and out-feed side may be conveniently reversed in position for making what is called either a right hand or left hand machine.

The bottles placed on the conveyor for being fed into the machine need not be positioned thereon in any regular order since mechanism is provided at the in-feed side to stop and release said bottles in properly timed order for transfer into the machine no matter how irregularly they may be placed upon the conveyor. Furthermore, each bottle as it is released for entrance into the machine renders operative a web feeding mechanism to present a hooding blank to the bottle at proper time in its progress through the machine.

The web material from which the hooding blanks are formed is preferably of Cellophane but may be any similar and relatively thin, flexible material for easily conforming itself to the shape of the bottle top.

The rotatable turret carries therewith a plurality of bottle supports or elevators (in the present machine two in number) onto which the bottles are transferred from the conveyor. Above each of said bottle elevators and also carried with the turret are headers, one for each bottle elevator, which serve to drape the hooding blank down over the top of the bottle as it progresses through the machine. Also carried with the turret and above said headers are corresponding tape applicator mechanisms which apply and wrap a binding tape around the draped hood of each bottle, so as to bind the hood thereon securely in place. When thus finished, the bottle is discharged at the out-feed side of the machine back onto the conveyor for delivery from the machine.

The foregoing operations will occur in properly timed relation on successive bottles which are continuously fed into and out of the machine. However, if a bottle is not presented by the conveyor to the in-feed side of the machine at proper time for the sequential cycle of operations of the machine, the web feeding mechanism will stop until a bottle is so presented, whereupon it will again start; also means are provided whereby the absence of a bottle on its elevator will serve to stop the operation of the tape feed and tape applicator mechanism corresponding to said elevator.

A further feature of the machine resides in the provision of means for effecting a quick and easy adjustment thereof for handling bottles of different height such as pint size bottles as contrasted with quart size bottles. For this purpose the turret is of telescopic construction with a lower part thereof carrying the bottle elevators and an upper part thereof carrying the headers and tape applicator mechanisms. A vertically slidable and adjustable carrier frame carries with it the upper part of said telescopic turret and a hand crank is provided for an easy manual adjustment of said carrier frame.

Referring more particularly to the drawings,

Figs. 1, 2 and 4, the main frame comprises a base cabinet 1 supported on legs 2 and containing therewithin usual driving motor (the supporting frame of which is indicated at 3). Driven from the motor by a change speed differential diameter drive pulley 4 and connecting belt 5, is a pulley 6 connected with reduction gears in gear box 7 from which extends what may be called the main drive shaft of the machine at 8. The motor frame 3 in accordance with the usual adjustment for such a change speed drive is adjustably and slidably mounted on ways 9 at the lower part of the main frame and the slidable adjustment for said motor frame is accomplished by hand wheel 10 outside of the machine through a connecting screw threaded sleeve and stem device at 11.

Extending vertically upward from the base frame of the cabinet 1 are stationary supporting posts 12, 13. Slidably mounted for vertical adjustment on said posts is a carrier frame comprising a vertical back portion 14 and upper and lower outwardly projecting horizontal beams 15 and 16. As shown in Fig. 36, a suitable clamp 17 is provided for securely holding said carrier frame in any one of its adjusted positions on posts 12 and 13. The means for manually adjusting said carrier frame to different vertical positions comprise a pair of lift rods 18 and 19, the lower ends of which (as shown in Fig. 4) are screw threaded and received in cooperating rotatable nut members 20 and 21. These members are supported by ball bearings on an integral wall of the base cabinet and are connected so as to rotate together by sprockets and chain, indicated at 22. A bevel gear 23 on the rotatable member 20 is driven from gear 24 and connected crank arm 25 for simultaneously elevating or depressing said lift rods 18 and 19 equally. As shown in Fig. 1, rod 18 is secured to the lower and back portion of the carrier frame so as to impart its lifting thrust in line with the back 14 of said frame. The lifting rod 19 is received through the outer ends of the horizontal beams 15 and 16 and extends axially through the turret hereafter described. The upper end of said lift rod 19 is slightly reduced in diameter at 19' to provide a shoulder 26 for imparting its vertical thrust to said beam 16 through intervening portions of said turret which said shoulder also supports.

The turret comprises a central driving column or shaft made up of two parts, the upper part 27 being in telescopic relation to lower part 28 so as to be slidable vertically thereon but rotatable therewith. The upper end of said turret shaft portion 27 has keyed thereto, for vertical and rotative movement therewith and in effect forming an extension thereof, a turret hub 29 which at its upper end is fastened to the turret head 30. An upper central portion of said turret head in turn is supported by a ball bearing upon the shoulder 26 of the lift rod 19, as above described.

Bottle elevator mechanism

As shown in Figs. 4 and 27, the lower member 28 of said turret driving shaft has keyed for rotation therewith a hub 31 of the platform elevator mechanism comprising bottle supports or elevators, of which in the present instance there are two in number located in diametrically opposite positions with respect to the turret. The hub 31 has projecting therefrom oppositely disposed flange portions 32 and 33 (see Fig. 27) upon which the platform elevator levers are pivotally mounted, one set of which will be described in connection with Fig. 30, it being understood that both platforms or bottle supports and their respective elevating mechanisms are alike in construction and operation.

Referring to Fig. 30, a pair of parallel carrying levers 34 and 35 are pivotally fulcrumed upon the flange 33 and at their outer ends support the platform or bottle support 36 in such manner that the upper flat surface of said support is always maintained in horizontal position during up and down movements thereof. An operating lever 37 is also pivotally fulcrumed on the flange 33 and carries at its outer end a connecting rod 38 which is slidable through a swiveled stud 39 on lever 34 and having adjustably fixed at its upper end, stop collar 40. A spiral spring 41 surrounds the rod 38 and is interposed between the outer end of lever 37 and said swivel stud 39 whereby an upward movement of lever 37 will yieldingly push up the carrying lever 34 and 35 and the downward movement of said lever 37 will, through said rod 38 and its stop collar 40, positively carry down said levers 34 and 35. The outer end of lever 37 carries a cam roller 42 which travels in cam groove 43 arranged circumferentially around a cam barrel 44, the latter being fixed to the top of the base frame cabinet as shown in Fig. 4. The contour of the cam groove 43 is such that the platform elevators or bottle supports 36 in their rotation with the turret will be successively brought to a substantially level position with the conveyor at the in-feed side of the machine for receiving a bottle thereon by transfer mechanism hereinafter described, and will thereafter raise said bottle to push its top through a header for action thereon by hooding mechanism and then finally return said bottle at the out-feed side of the machine to a level with the conveyor belt for discharge thereon.

Headers

A header frame 45 is formed integrally with the lower part of said turret hub 29 and is located for rotation therewith above the lower beam 16. Carried at opposite sides of said header frame 45 are the two headers, such as 46, which headers (together with their appurtenances) are exactly alike in construction and therefore the duplicated parts thereof will be marked with similar reference characters. Each of these headers comprise a substantially rectangular flat plate member with projecting arms at each side thereof for being detachably mounted upon hubbed arms 47 and 48 projecting from the header frame 45.

Centrally of the header plate 46 is an opening 49 to permit of a bottle head and neck being pushed therethrough and said opening 49 is bordered by a plurality of flexible inwardly projecting tongue members 50 which may be made of rubber or the like and which are designed for draping the blank of hooding material down over the head and neck of the bottle when the latter is thrust upwardly through said opening 49. For this purpose it will be understood that a blank of hooding material H, such as Cellophane or the like will have been presented to the under side of the header and across the opening 49 prior to the upward thrust of the bottle therethrough (see Fig. 3). The hood-blank is supplied to each header by a web feeding means hereinafter described, said blank being projected by said feeding means over and in contact with a stationary hood-blank guiding table 51 past which said header travels in its rotation. For reducing friction on the projected blank as it is presented to the header, the guiding table 51 is constructed with spaced apart grid members 52, as shown in Fig. 60.

In order to pick up said presented blank and hold the same in proper relation with the underside of the header, the latter is provided with a pair of spaced apart pick-up fingers 53 and 54 which fingers are carried on a rocking shaft 55 journaled at one side of the header plate 46, as shown in Fig. 60. A spring 56 connected between an arm on said shaft 55 and the header plate 46 tends to close said fingers 53 and 54 against the under side of said header plate in clasping position upon an interposed blank. Rubber pads 72 are provided on said fingers 53 and 54 for the actual contact with said blank. The fingers 53 and 54 are held in open position away from said header plate 46 as the header approaches the blank being presented over table 51. Also when the bottle top is raised on its platform elevator 36 to push the blank through the header opening 49 the fingers 53 and 54 are again opened against the tension of their spring 56 to release the blank. For this purpose the finger shaft 55 is provided with a downwardly projecting cam arm 57 with roll 58, which latter travels in contact with the periphery of a circular cam flange 59, forming part of a cam table 62 fixed to the inner projecting end of the lower beam 16. As shown in Fig. 59, this cam flange 59 is provided with adjustable cam segments 60 and 61 which are so positioned thereon as to actuate the fingers 53 and 54 at proper times for receiving and clasping the blank as the header approaches the blank presenting station and for releasing the blank thereafter when the bottle meets the blank for thrusting the same through the header opening 48.

In order that the bottles may be properly held and guided upon the flat surfaces of the elevator supports 36 in their travel around with the turret, each of said supports is provided with an adjustable bottle guide 63 which engages one side of the bottle on said support 36, as shown in Fig. 27. A shield 64 mounted on stanchions 65, 66, 67 and 68 rising from the base cabinet 1 is also preferably provided (as shown in Figs. 2 and 27) for enclosing the path of travel of said bottles on their supports during rotation of the turret. Additional guiding devices 69 and 70 are adjustably fixed to the upper ends of stanchions 65 and 68 for insuring the proper position of the bottles on their supports at the in-feed and out-feed sides of the machine.

Tape applicator mechanism

Each bottle, while its top is protruding through the header with the blank of hooding material draped over the same by the action of the header, is further acted upon by tape applicator mechanism which applies a binding tape around the draped hood at the neck of the bottle to more securely hold the hood in place and seal the same to said bottle head as shown in Fig. 66.

The turret head 30 has depending from opposite ends thereof spindle columns such as indicated generally at 71, one for each header (see Fig. 3). As these spindle columns and their driving means are both the same in construction, only one will be described, and the same reference characters will be used for duplicated parts thereof. Referring to Figs. 3, 15, and 16, the spindle column comprises a bearing sleeve 73 fixed to the turret head 30. Extending downwardly from within said bearing sleeve are inner and outer rotating tubular spindle shafts 74 and 75. Axially through the inner spindle shaft 74 extends a bottle stem 76 having at its lower end a stem cap 77 adapted to meet and clamp upon the top of a bottle on its platform elevator 36, as indicated in Fig. 18. Means are provided during rotation of the turret, as will be later described, for rotating the outer spindle shaft 75 at faster speed of rotation than the inner spindle shaft 74, said relative rotative speeds in the present machine being about three revolutions of the outer spindle shaft to two revolutions of the inner spindle shaft. The reason for these relative rotative speeds between said spindle shafts is that the outer spindle shaft 75 serves as the carrier for the tape applicator frame and certain appurtenances thereof, while the inner spindle shaft serves as a cam shaft from which operative action is derived for certain parts of the applicator mechanism.

As shown in Fig. 62, a tape supply reel 78 is fixed to the outer spindle shaft 75 by clamp 79. Likewise the tape applicator frame 80 is clamped to the outer spindle shaft 75 by clamp 81. As shown in Figs. 63 and 64, a clamp 82 is fixed to the inner spindle shaft 74. Adjustably fastened to this clamp 82 is a carrier piece 83 upon which is pivoted at 84 for limited and yielding movement a toothed driving segment 85. A pin and slot connection at 86 between said segment 85 and carrier piece 83 provides for the limited movement of said segment and a spring 87, housed in the clamp 82, bears against said segment normally tending to keep said segment in its outer position but yieldingly permitting it to move slightly inwardly. The driving segment 85 is adapted to have intermittent engagement with a toothed pinion 88 carried in the applicator frame 80 and to serve as an intermittent drive for the tape feed, as will be later described. Directly below the clamp 82 and fastened thereto by bolts 89 are superposed cams 90 and 91 (see Fig. 76). The lower cam 90 actuates a tape cutting knife and the upper cam 91 operates an applicator finger, and as will be described the said cutting knife and fingers are both carried on the applicator frame 80. It will be noted by the above construction that the driving segment 85, the knife cam 90, and the applicator finger cam 91 are all carried as fixed to the inner spindle shaft 74 which, as before stated, rotates slower than the outer spindle shaft 75 upon which is fixed the applicator frame 80.

The operation of the applicator mechanism in feeding, applying and sealing the tape about the skirted portion of the hood-blank around the neck of the bottle will be more clearly understood from reference to Figs. 67 to 74 inclusive, taken in connection with the figures just previously mentioned. As pointed out in my former application Serial No. 120,513, the present apparatus contemplates the use of tape material which becomes self adhesive when heated. The tape applicator finger of the present mechanism is designed for being electrically heated as described in said application.

An improvement in the operation of the tape applicator mechanism is provided herein by the employment of a special form of tape clamping mechanism which acts in conjunction with said tape applicator mechanism for insuring a more positive hold on the tape during its wrap around the hooded neck of the bottle.

Figure 67:
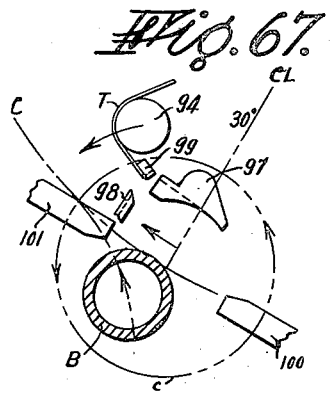

Referring to Fig. 67, the parts therein shown are in the position which they assume when the bottle is being transferred from the in-feed part of the conveyor to the bottle support or elevator 36, and in this view the bottle support 36 has been carried with the turret an angular distance of 30° clockwise from an assumed initial position of 0° shown in Fig. 27. The tape T on tape supsupply reel 78 runs downwardly therefrom over guide wheels 92, 93 and 94 (see Fig. 62), the last named wheel 94 constituting a feed wheel for said tape. This feed wheel 94 (as shown in Fig. 65) is fixed to the lower end of a shaft 95 mounted in ball bearings on the tape applicator frame 80 and having fixed to its upper end the toothed pinion 88. A presser roll 96 is spring pressed against wheel 94 to assist in the feed of said tape thereby. The tape is fed intermittently a measured amount by means of said driven pinion 88 and its driving segment 85. The proper timing for this intermittent feed is accomplished by adjustment of carrier piece 83 and its driving segment, on the clamp 82. As previously stated, the segment 85 is carried in rotation by the inner and slower moving spindle shaft 74 whereas the driven pinion 88 is carried with the outer faster rotating spindle shaft 75 and therefore has an orbital travel around the driving segment 85 for intermittent engagement therewith as it moves therepast. For insuring that this driving engagement of pinion 88 with segment 85 shall be both certain and positive in its action, I have formed these coacting parts with inclined teeth directed as shown in Fig. 64, and I have also mounted the driving segment 85 so as to be slightly yielding as previously described. It will be noted that the teeth of the faster moving member 88 are inclined in the direction of its orbital travel and that the teeth of the coacting driver 85 are oppositely inclined. This arrangement will insure that said teeth will positively engage when they meet and not slip out of engagement during the travel of 88 past 85. Furthermore, the yielding character of said driving segment 85 insures that said teeth will always mesh properly as they come into engagement and once the teeth are engaged there will be no slipping between the driving and driven elements whereby the tape can be fed forward a definitely measured amount, which is of great importance in tape applicator mechanism of the character here involved.

Reverting to Fig. 67, the bottle, indicated at B, is just being moved onto the elevator platform or bottle support 36 (not shown). The dotted line CL represents a center line through the turret axis of rotation and the center of a bottle elevator 36, and as here indicated shows 30° of angular travel of said elevator from the initial zero position of Fig. 27. The dotted line circle C represents the orbital path of said elevator and bottle and the dotted line circle c represents the rotational path of the tape applicator mechanism around the bottle and its elevator.

In Fig. 67 a portion of the tape applicator finger is indicated at 97, the tape cutting means at 98, 99, and tape clamps at 100 and 101. From the later description to be given of the means for operating these parts, it will appear that the applicator finger 97, tape feed wheel 94 with its tape T, and tape cutting means 98 and 99, in addition to their orbital travel around the axis of the turret as indicated by circle C, also have a rotation around the bottle B as indicated by circle c, whereas the tape clamps 100 and 101 do not partake of this rotational movement but only the orbital travel with the turret.

Figure 68:
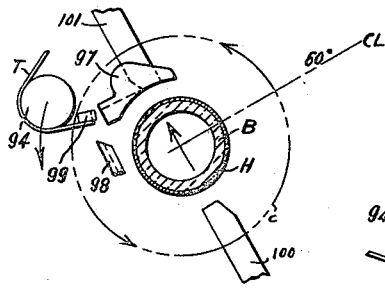

In Fig. 68, the bottle is represented as being centered on its elevator platform, a hood blank H has been draped around its top and neck, and the angular or orbital travel of said elevator platform and bottle has progressed to 60°. In this position, however, no movement of the tape applicator appurtenances has yet taken place relative to the bottle.

Figure 69:
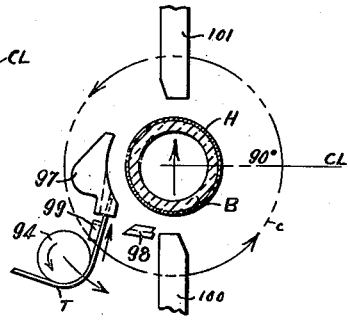

In Fig. 69, which is the 90° position of angular or orbital travel of the platform elevator, a slight feed of the tape T has occurred by rotation of feed wheel 94 so that its end has been advanced into a slot or groove at the inside of the tape applicator finger 97. The other parts have remained unmoved except for their orbital and rotational travel.

Figure 70:
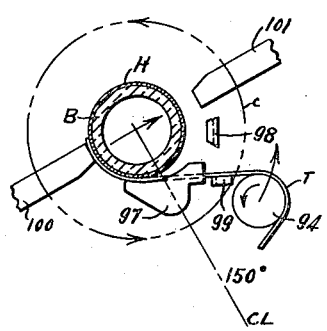

In Fig. 70 the orbital travel of the bottle on its elevator platform has progressed to 150°. A further length of tape has been fed out by the feed wheel 94 due to the continued relative travel between pinion 88 and its segment 85. The end of the tape has been projected against the side of the draped bottle neck and the tape clamp 100 has moved inwardly to clamp the end of the tape firmly against the bottle. At this time also the applicator finger 97 has moved inwardly to bring its inner concave side in wiping contact with the tape as it passes thereunder and press it against the neck of the bottle during the further rotational travel of said finger around the bottle. This further travel of the tape applicator finger 97 in wiping the tape around the neck of the hooded bottle is shown in Fig. 71, which indicates the position of the bottle and its platform advanced 200° of its orbital travel.

During the rotational travel of tape applicator finger 97 and feed wheel 94 around the circle c, a further length of tape is drawn from the tape supply for said wrapping around the neck of the bottle since the end of the tape is firmly held against the bottle by the tape clamp 100. It will be understood that during this further draw off of tape by the action of the applicator finger 97 and tape clamp 100, the driving segment 85 will have passed out of engagement with the tape feed wheel pinion 88 so as to permit said draw off to be free except for a let off brake on the tape supply reel.

Figure 71:
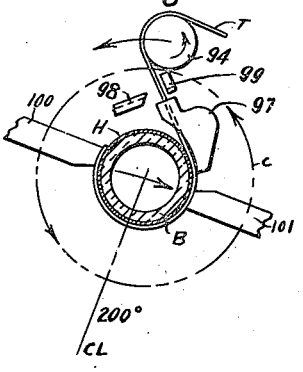
Figure 72:
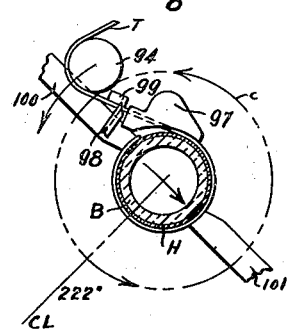
Figure 73:
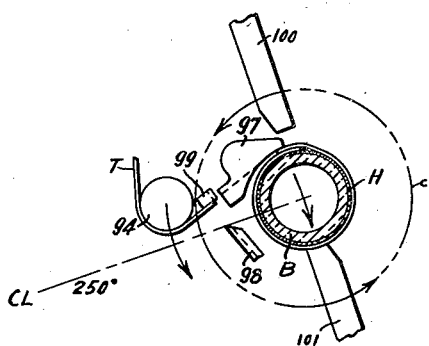

As indicated by comparing Fig. 70 with Fig. 71, the second tape clamp 101 (preferably located diametrically opposite to first tape clamp 100) is moved in to firmly clamp the tape against the bottle as soon as the applicator finger 97 has traveled past this second tape clamp 101. For a time thereafter, both tape clamps are firmly holding the tape against the neck of the bottle as shown in the next progressive view, Fig. 72, wherein the tape is just about to complete its wrap around the bottle and be overlapped. In this position of the parts in Fig. 72, the movable knife 98 has moved in against its shear block 99 and severed the tape just at the rear of the tape applicator finger, leaving enough tape extended in and underneath said finger to be overlapped over the initial end of the tape. In order that said tape may be overlapped as shown in the next progressive view, Fig. 73, the first tape clamp 100 is moved outwardly away from its engagement with the tape, while the tape applicator finger moves therepast in overlapping the trailing end of the cut-off tape over the initial end. During this overlapping action, the tape will not be displaced because it will still be held firmly in position against the neck of the bottle by the second tape clamp 101 as shown in Fig. 73.

Figure 74:
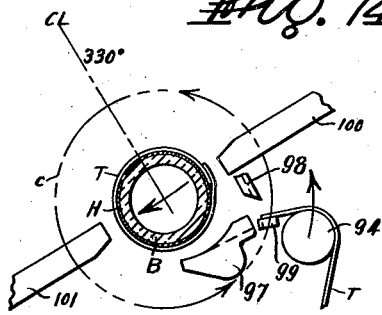

The importance of this constant grip of the tape by one or the other of said tape clamps during the complete encirclement and overlapping of the tape is two-fold: first, it insures a very snug and tight wrap of the tape around the draped hood at the bottle neck, and furthermore it prevents any displacement of the tape at the time of its wrap by the applicator finger while it is being seal hardened in position as a secure fixture for the hood. As will be described, the tape applicator finger 97 is electrically heated so as to impart sufficient heat to the tape sliding in contact with its inner surface to warm the tape into self-sealing condition. This heating and sealing action of the tape takes place progressively as the same is wiped around the neck of the hooded bottle and as soon as the tape passes out of contact with said heated finger it begins to cool and harden into sealed adhesive contact with the hood and with itself at the overlapping ends thereof. However, the rapidity of this sealing and hardening action of the tape cannot always be relied upon to hold the tape against slipping and breaking its sealing contact with the hood during the overlapping action of the applicator finger on the tape ends; and therefore I have provided this additional tape clamp to insure against any displacement of the tape while its ends are being overlapped. After the ends of the tape have been overlapped the wiping action of the tape applicator finger ceases by being withdrawn from the bottle, and the second tape clamp 101 may also then be withdrawn as shown in Fig. 74. By this time the tape will have become sufficiently self-sealed in position and will not be displaced by the subsequent ejection of the hooded bottle from the header.

The position of the parts in Fig. 74 is at 330° from the initial position, and corresponds to the position of parts shown in Fig. 32 wherein the bottle has been withdrawn from the header by the downward movement of the platform elevator and said bottle is about to be transferred from said elevator platform back to the discharge end of the conveyor.

The means for operating the tape clamps above described will be clear by reference to Figs. 57 to 61 inclusive. As shown in Fig. 57, a pair of oppositely disposed tape clamps are provided for each header, as indicated at 100, 101.

The tape clamp 100 is carried on the outer end of an arm 102, which arm is fixedly clamped to a rockable extension sleeve 103 journaled on a fixed stud shaft 103' of the header frame 45. A collar 103" is pinned to the end of the stud shaft 103' to hold the sleeve 103 in place. The sleeve 103 is integral with a double tooth arm 114 and it should be understood that clamp 100, sleeve 103, and arm 114 all rock as a unit on stud 103'. In a similar manner, tape clamp 101 is carried on arm 104 fixedly clamped to extension sleeve 105 journaled on a fixed stud shaft 105', said sleeve 105 being part of a double tooth arm 114'. A collar 105" holds said sleeve 105 on its stud 105'. The arm clamps 102 and 104 each have downwardly projecting therefrom integral arms 106 and 107 which are connected by spring 108 which tends to swing the tape clamps 100 and 101 inwardly toward one another and against the neck of the bottle when the latter is in the header.

As before explained, the operation of said tape clamps occurs at different times relatively to one another and therefore these clamps are independently controlled in their inward and outward movements. Tape clamp 100 is controlled by a bell crank lever 109 (see Fig. 61), one arm of which carries a roller 110 adapted to bear on a ridge cam 111, which is fixed to the stationary cam table 62. The bell crank arm 109 is mounted on a pivot stud 112 carried by the header frame and has a short single toothed arm 113 which engages and coacts with the double toothed arm 114 integral with extension sleeve 103 upon which arm 102 is clamped, whereby the tape clamp 100 is actuated for properly timed movement by ridge cam 111. In a similar manner tape clamp 101 is operated from bell crank 115 which has a roll 116 bearing on ridge cam 117. It will be understood that the spring 108, which tends to swing the tape clamps inwardly, also serves to keep the bell crank cam rollers 110 and 116 down against their respective ridge cams.

The operating mechanism for the applicator finger 97 and tape cutter will be more clearly understood by reference to Figs. 62, 75 and 76. The lower or tape contacting portion of the applicator finger is shaped as shown at 97 (Fig. 76) and rising from this lower end is a vertical shank portion 123 which is shaped to house an electric heating cartridge 118. The applicator finger is fastened upon a carrying arm 119, the latter being pivoted at 120 on the applicator frame 80. A spring 121 is fastened between the stationary part of the applicator frame 80 and said applicator finger lever 119 normally tending to move said applicator finger inwardly. A cam roll 122 is carried on the applicator finger lever 119 for bearing against the applicator cam 91 which controls the outward movement of said applicator finger. This cam 91, as previously described, is fixed to the inner spindle shaft 74 for rotation therewith. The movable knife 98 for cutting the tape is carried on a swinging arm 124 pivoted at 125 in the applicator frame 80. A spring 126 is connected between movable arm 124 and a portion of the applicator finger lever 119, and tends to move the cutter knife 98 inwardly against its shear block 99 fixed to the applicator frame. The knife lever 124 carries a cam roller 128 and cam drop-off piece 129, which bear against the periphery of the knife cam 90, which cam is also fixed to rotate with the inner spindle shaft 74 as described. The tape presser roll 96 is carried in a block member 131 pivoted at 132 on the applicator frame. A double ended torsional spring 130 is mounted on pivot 132 for swinging block 131 and pressing its roll 96 toward the feed roll 94. A tape guiding and stripping piece 134 is fastened to the block 131 in adjacent position to the presser roll 96, as shown. An adjusting stop screw 135 is carried on the block 131 and bears against stationary part of the applicator frame 80 for limiting and determining the inward movement of the presser roll 96 toward tape feed roll 94.

The electric heating cartridge 118 for the applicator finger 97 is of the usual resistance type and receives current through a conducting cable 136 connected to a sliding contact member 137 which is carried in tape reel clamp 79 and which bears against a commutator ring 138 which is insulated by ring 139 from spindle shaft sleeve 73. Further details of the electric heating means and method for varying its intensity depending on whether the tape applicator mechanism is at work or at rest need not be further described since this is fully explained in my previous applications above referred to.

The position of the parts shown in Figs. 63, 75, and 76, is in the same phase of operation and corresponds to the stop position for the spindle drive mechanism which occurs when no bottle is present on the elevator beneath this particular tape applicator mechanism.

*Spindle drive mechanism*

The means for rotating the spindle shafts 74 and 75 and the means for stopping the same upon failure of a bottle to be present on the corresponding platform elevator will now be described, referring more particularly to Figs. 3 and 8 to 18 inclusive. In the head 30 of the turret there is mounted at each side of the turret axis the respective mechanisms for driving the spindle shafts, and since these are identical it will suffice to describe the driving mechanism for one of said spindle columns.

Referring to Fig. 3, the bevel gear 140 is fixedly keyed to the lift rod 19 for being held stationary and as the turret is rotated by means hereinafter described, coacting bevel gears 141 and 142 are driven by being in mesh with gear 140. Connected to bevel gear 142 and extending to the outer right hand end of the turret head 30 (as shown in Fig. 3) is a driving shaft 143. Loosely mounted on the outer end of said driving shaft 143 are inner and outer ring bevel gears 144 and 145 fixed together upon a driven sleeve 146 which surrounds the driving shaft 143 and extends inwardly for about half the length of said driving shaft 143. A bevel gear 147 is fixed to the inner spindle shaft 74 and meshes with the inner ring bevel gear 144. A bevel gear 148 is fixed to the outer spindle shaft 75 and meshes with the outer ring bevel gear 145. It will be observed that the inner ring gear 144 is of smaller diameter than the outer ring gear 145 and the bevel gears 147, 148 driven therefrom are about the same size. The relation of these gears is such that the outer spindle shaft 75 will be rotated at a ratio of three to two with respect to the rotation of inner spindle shaft 74.

The means for connecting and disconnecting the sleeve 146 of the bevel gears 144 and 145 from the driving shaft 143 are illustrated more clearly in Figs. 8 to 13. As shown in Fig. 8, a single notch tooth wheel or driving clutch member 149 is keyed to shaft 143. Along side of this clutch driving member 149 is a clutch driven member 150 (see Fig. 9) which is loosely mounted upon the sleeve 146. The clutch driven member 150 carries thereon a pivoted clutch lever 151 having a notch shoulder adapted to engage the tooth of the driving clutch member 149. A spring 152 normally tends to hold said pawl 151 in clutching engagement with the tooth driving member 149. The clutch driven member 150 drives the sleeve 146 by shock absorbing means through the intermediary of a cam disk 153 which lies adjacent to said clutch driven member 150, said cam disk 153 being keyed to the driven sleeve 146. The shock absorbing driving connection between member 150 and cam disk 153 is provided by a projecting arm 154 of the member 150 and an angle piece 155 fast to the cam disk 153, having between said pieces 154 and 155 a rubber block 156. Also fixed to the cam disk 153 (as shown in Fig. 12) is a back stop piece 157 which engages a back stop pawl 158 at certain times to prevent any reverse rotation of said cam disk 153 and its driven sleeve and spindle shafts, as will be described in connection with the clutch throw out means.

As shown in Fig. 15, bottle stem 76 extends upwardly and axially through the inner spindle shaft 74. The lower end of stem 76 carries a stem cap 77 to engage the top of the bottle as shown in Fig. 18, and the upper end of said stem carries head 159 adapted to abut against an adjustable stop screw 160 mounted in the turret head. The function of the stop screw is to accurately determine the uppermost position of the bottle top when raised by the bottle elevator in order that the tape applicator mechanism heretofore described will always apply the tape at the proper distance from the top of the bottle. Bottles will vary slightly in height and the yielding elevator will accommodate such variations. The stop screw 160 therefore provides a reference point from which to locate the tape on the bottle neck.

A stem actuated lever 161 is loosely and pivotally connected with the block 159 at 162, and said lever 161 is fast to a rocking shaft 163 carried in suitable bearings at one side of the turret head (see Fig. 16). A cam arm 164 is fixed to said shaft 163 and has a roller 166 for bearing against the periphery of the cam disk 153. A spring 165 is fastened between the turret head and said lever 161 tending to pull said lever and its stem downwardly and to keep the cam roll 166 down toward the periphery of cam disk 153. The contour of the cam disk 153, however, is such that when a bottle is beneath the stem 76 and engaged by its cap 77, the roll 166 will be held slightly out of contact with said cam disk 153 except for a brief period in unclamping the stem cap from the bottle when the latter is to be discharged from its elevator. The cam disk acts to permit the downward movement of the stem cap to the lower dotted line position in Fig. 15 so as to eject the bottle down through the header. This ejecting position is also shown in Fig. 14. It also acts to raise the stem to pass over the hood blank table 51 during the rotation of the turret but the raising of stem 76 by cam disk 153 is only up to the limit of said solid line position shown in Fig. 15. The further raising of said stem cap 77 to the upper dotted line position shown in Fig. 15, must be accomplished by the presence of a bottle on the elevator since this is the so-called tripping position of the stem 76 for keeping the spindle drive clutch closed for continued rotation of the spindle shafts as will be described.

The outer end of the stem actuating lever 161 is extended and carries a roll 167 adapted to engage a bent arm 168 (see Figs. 14 and 18) which is fixed to a rock shaft 169 mounted in suitable bearings at the other side of the turret head from shaft 163. A spring 170 is connected to said bent arm 168 and to a stationary part of the turret head tending to pull said bent arm downwardly and rock the shaft 169 counterclockwise. A stop arm 171 is fixed to the shaft 169 and is adapted to abut a stationary bracket of said turret head to limit the counterclockwise movement of shaft 169 (see Fig. 11).

The inner end of said shaft 169 has fixed thereto a clutch throw-out dog 173, the outer end of which swings up and down with the rocking of said shaft 169. When in its down position (see Figs. 8, 9 and 12) this throw out dog 173 will lie in the path of a notched end 174 of the clutch lever 151 to tilt said clutch lever out of clutching engagement with the toothed driving wheel 149 and thereby declutch or disconnect the driving shaft 143 from the driven sleeve 146 and stop the parts driven by the latter.

In the event that a bottle is on its elevator beneath the stem 76, the rising of said elevator brings the bottle top into contact with the stem cap 77 to push up said stem 76 for rocking lever 168 into position as shown in upper dotted lines, Fig. 15, and in solid lines, Fig. 18. This causes the roll 167 of said lever 161 to engage bent arm 168 and rock shaft 169 clockwise, which will raise the end of the clutch throw-out dog 173 out of the path of notched end 174 of said clutch lever 151 (see Fig. 13). Under these conditions, the clutch will continue to remain in engagement and the parts driven by shaft 143 will continue in operation.

The position of the stem cap 77 thus raised by the bottle in rendering the throw-out member 173 inactive is shown in Fig. 18, and also by the upper dotted line position of said cap 77 in Fig. 15. The solid line position of cap 77 in Fig. 15 is the upper limit thereof as raised by the cam disk 153 bearing against roller 166 and this position is not high enough to trip the throw-out member 173 into its inactive position. The lowermost dotted line position of the stem cap 77 (shown in Fig. 15) is that position which it assumes when ejecting a bottle downwardly through the header after it has been hooded and taped. This downward movement of the stem cap is occasioned by action of spring 165 and the cam roll 166 running through the lower part of said cam disk 153.

In the event that a bottle is not on its elevator and does not engage the stem cap 77 as described, the clutch throw-out dog 173 will be held down by spring 170 into a position for engaging the notched end 174 of the clutch throughout dog 151 and disengage said clutch for stopping the rotation of the spindle shafts. This disengaging action of the clutch is brought about by the rocking of lever 151 against the tension of its spring 152. Immediately after said disengagement has been effected, the tension placed on spring 152 tends to rotate the clutch member 150 counterclockwise slightly, which movement (if permitted) would displace the proper stopping position for the spindle shafts and appurtenances of the applicator mechanisms which are operated thereby. To prevent any such backward recoil movement of said clutch member 150 and related parts, a back stop piece 157 and its pawl 158 are provided.

The back stop pawl 158 is loosely pivoted upon said rock shaft 163 adjacent to the cam arm 164, and the outer end of said pawl 158 normally comes to rest against a projecting end of the bearing pin which carries the cam roll 166. A coil spring 172 is provided to normally swing said pawl 158 in a clockwise direction so that its lower corner will be engaged by the back stop piece 157 on the cam disk 153 whereby said piece 157 can ride by said pawl in a clockwise direction but will be checked from return movement against said pawl.

*Web feeding mechanism*

The web feeding mechanism for presenting a hood blank to the bottle for being draped thereover by the header will now be described. This mechanism is conveniently mounted on the carrier frame, principally on the back 14 and lower beam 16. The web supply W, which may be Cellophane or the like, is carried on a reel 175 having a suitable let-off brake device 176 and mounted in carrier frame back 14.

The web W is led off from its supply around idler tension roll 177, between rear feed rolls 178 and 179 and then between forward feed rolls 180 and 181 (see Fig. 51). The web, in passing from roll 179 to roll 180, is guided over a suitable supporting table formed by spaced grid bars 182 (plan view of which is shown in Fig. 54). The rolls 179 and 180 are the positively driven feed rolls, and rolls 178 and 181 are presser rolls coacting respectively therewith for feeding the web. Rolls 177 and 178 are carried in swinging bracket arms 183 pivoted at 184 on the frame and a spring 185 is mounted to normally hold presser roll 178 against its driving roll 179. The roll 181 is carried in an overhanging cutter bar frame 186 which is pivoted at its rear end on the same shaft 187 upon which feed roll 179 is mounted. The forward end of the cutter bar frame 186 carries a notched knife bar 188 forming one member of the web cutting means. Also on this frame 186 are mounted a pair of spaced apart creasing blades 189 which extend downwardly into the space between two of the grid plates 182 and act to impart a stiffening crease in the web which tends to make the web self supporting as it is projected forwardly from the feeding rolls. The other cooperating member 190 of the web cutting means is also a notched knife bar and is carried in a lower swinging knife frame 191 which is pivotally mounted at its rear end upon shaft 187. This shaft 187 for roll 179, as well as shaft 192 which carries roll 180, are both mounted in a stationary frame fixedly attached to the lower beam 16.

The lower knife frame 191 carries at one side thereof a cushion stud 193 which lies beneath an overhanging ledge 194 of the upper knife frame and serves to raise the latter when the lower knife frame is raised. Normally, however, the upper knife frame 186 has only a limited upward swinging movement whereby the lower knife frame may be moved upwardly relatively thereto for bringing notched knife bars 188, 190 into cutting relation for cutting off the web. The purpose of thus raising the upper knife frame slightly during the web cutting operation is to disengage the forward feed rolls 181 and 180 and stop the web feed momentarily at this point while permitting said web feed to continue at the rear feed rolls 179 and 178. This disengagement of the forward feed rolls 181, 180 takes place at a time when the cutting members 188 and 190 are closed, and therefore the cut end of the web is stopped against the knife blade 190 and the web between the same and feed rolls 179 and 178 loops up slightly as shown in Fig. 52. When the lower knife frame 191 again drops to separate th knife blades 188 and 190, the forward feed rolls are again engaged to feed the web. As will be described, the forward feed rolls 180, 181 have a slightly faster rotation than the rearward feed rolls 179, 178 whereby the looped up web is gradually straightened out upon re-engagement of the forward feed rolls. This arrangement permits the rear fed rolls 179 and 178 to operate continuously for a steady draw-off of web from its supply reel 175 whereby the length of web for a hood blank can be more accurately measured for being projected across the hood blank table 51.

The limited upward movement of said upper knife frame 186 is stopped by swingable hang-down member 195 pivoted at 196 on the frame and which has an adjustable abutment to engage a stop plate 197 on said overhanging knife frame. Means are provided to adjust the abutting element of said hang-down member 195 for permitting a varied amount of limited movement to the upper knife frame 186. For conveniently threading the web through the feed rolls between the knife frames, the hang-down member 195 may be swung upwardly manually out of its stopping position which will permit lifting up the upper knife frame a sufficient distance for giving access to the web guide table 182 beneath the same.

The web W is fed forwardly by the aforesaid feeding means a sufficient distance over the blank guide table 51 to form the measured blank for the hood when cut off by the aforesaid web cutting means. The parts are so timed in their operation that the blank projected over the table 51 is picked up by a header 46 in its rotation with the turret, practically simultaneously with the cutting off of said blank.

The power for driving the aforesaid web feeding means is derived from the rotating turret shaft by the following mechanism. As shown in Fig. 35, a bevel gear 198 is fixed to the upper part of the turret shaft 27 for rotation therewith and meshes with bevel gear 199 on the forward end of the web feed driving shaft part 200. The driving shaft for the web feed is horizontally disposed in suitable bearings provided by the lower beam 16 and is formed of two parts 200, 201, in end to end alignment and adapted to be connected together by clutch means shown in side view in Fig. 44. The rear part 201 of said shaft carries fixed thereto a cam 202 which coacts with the cam roll 203 carried on the lower knife frame 191 for raising and lowering the same. The rear end of said shaft part 201 has a beveled gear 204 for driving mesh with the bevel gear 205.

As shown in Fig. 39, bevel gear 205 is fixed to a tubular transverse shaft 206 rotatable on a bearing rod 207 supported in a stationary frame fixed to the lower beam 16. Integral with said transverse shaft 206 is a spur gear 208 which (as shown in Fig. 40) is in meshed driving engagement with two smaller pinion gears 209 and 210. The pinion gear 209 is fixed to the feed roll 180; and pinion gear 210 is fixed to the feed roll 179. The pinion gear 209 is slightly smaller in diameter and has a few less teeth than pinion gear 210 whereby feed roll 180 will have a slightly faster rotation than feed roll 179 in being driven by the same spur gear 208. The feed rolls 180 and 179 have the same diameter, therefore the feeding effect on the web W given by roll 180 will be slightly faster than that given by feed roll 179 for the purpose heretofore described.

It has been stated that in the event a bottle is not fed into the machine at the proper time for being carried by one of the elevators 36 to meet the hood blank which would be presented to the header as above described, then the web feeding means is stopped and there will be no blank presented to the header as it passes the blank table 51. For accomplishing the aforesaid result, the clutch means of the web feed drive shaft 200, 201 (shown generally in Fig. 44) is designed to be disengaged by suitable connections with detector mechanism at the infeed side of the machine which determine whether or not a bottle is fed into the machine at proper time for the subsequent operations thereon.

Referring more particularly to Figs. 41 to 48 inclusive, there is fixed to the end of drive shaft part 200 a clutch carrier block 211. Fixed to the adjacent end of said drive shaft part 201 is a clutch collar 212 having a single notch tooth 215. Journaled in the clutch carrier block 211 is a rockable pawl shaft 213 having at one end a pawl tooth 214 which in one position is adapted to ride around the periphery of collar 212 without engaging the notch tooth 215 of the latter. The other end of the pawl shaft 213 has integral therewith a radially projecting throwout arm 216. As shown in Fig. 48, a coil spring 217 is housed in the carrier block 211 and bears against said arm 216 tending to throw it and its pawl shaft 213 in such position that the pawl tooth 214 will engage the notched tooth 215 of the clutch collar 212 (as shown in Fig. 45) and thus maintain the clutch parts in engagement for constant drive of shaft part 201 by shaft part 200.

Referring to Fig. 35, there is mounted in suitable bearings on the underside of the beam 16 a slidable rod 218 which has fixed thereto a clutch throw-out cam 219. In one position (Figs. 35, 37) of this slidable rod 218 the aforesaid throwout cam 219 will lie in the rotative path of the pawl throw-out arm 216 (as shown in Figs. 46 and 47) so as to rock arm 216 and its shaft 213 against the tension of spring 217 and turn pawl tooth 214 out of engagement with clutch tooth 215 of the collar 212. This action disconnects the clutch and stops the web feeding means and said clutch will not be re-engaged until the clutch throw-out cam 219 is moved out of the path of said arm 216.

Referring to Fig. 37, the slidable rod 218 which carries the clutch throw-out cam 219 is provided with a coil spring at one end bearing against a stationary part of the frame which tends to throw said rod to its left position as viewed in Fig. 37, in which position the throw-out cam 219 is in the path of arm 216 for disengaging the clutch. The right hand end of slidable rod 218 has fixed thereto a stop collar 220 which limits the leftwise movement of said rod to the position shown in Fig. 37. The left end of said rod 218 carries an abutment plate 221 against which is adapted to bear a crank arm 222 with roller 127, which crank arm is carried at the upper end of rockable vertical trip shaft 223. The clockwise movement of said shaft 223 is limited by the roller 127 (shown in dotted lines, Fig. 37) abutting a flange on stationary beam 16 at which point the roller 127 is away from plate 221. The rocking of shaft 223 is brought about by detecting mechanism at the infeed side of the machine which will be later described. It will suffice to say at this point that when a bottle is admitted to the machine, the rock shaft 223 will be turned in the direction of the arrow in Fig. 37 and push the slidable rod 218 to the right for displacing the throw-out cam 219 from its clutch throw-out position, whereby said clutch will either engage or remain in engagement when the clutch arm 216 rotates past the position previously occupied by said cam 219. Thereupon the drive shaft 200, 201 will operate the web feeding means for projecting a blank above the table 51 for being picked up by the header to meet the bottle as it comes around on its platform elevator.

Bottle release and detector mechanism

The bottle release and detector mechanism at the infeed side of the machine will be clearly understood by reference to Figs. 19 to 27 inclusive. As shown in Fig. 27, at the front of the machine there is provided a continuously traveling slatted conveyor 225 for bottles. In the present arrangement, the left portion of this conveyor serves to bring the bottles to the infeed side of the machine whereas the right portion of said conveyor serves to deliver bottles away from the out-feed side of the machine.

It is customary in machines of this character to require for proper operation in bringing bottles to the machine that the bottles be placed on the conveyor in regular order, spaced apart at definite distances, and that the conveyor be synchronized carefully with the rest of the machine in order to feed said bottles into the machine in proper timed relation to the cyclic operation of said machine. In the present improvement, however, I have devised suitable stop, release and detector mechanism for the bottles on the conveyor so that it becomes immaterial how irregularly the bottles may be placed upon the conveyor; and moreover, the speed of travel of the conveyor need not be synchronized with the remainder of the machine, it being merely necessary for efficient operation, that the conveyor bring bottles to the machine and take them away at least as fast as the machine can handle the bottles.

Mounted at the in-feed and out-feed sides of the machine in symmetrical position with respect to the center line thereof, are bottle transfer members 226 and 227. These transfer members are alike in construction and are similarly mounted and driven. They are preferably in scroll shape and have suitable cushioned pushing faces 228 and 229 respectively for engaging against the side of the bottle in transferring the same off or onto the conveyor 225. The transfer members 226 and 227 are carried for rotation, member 226 being detachably mounted on a vertical transfer shaft 230 and member 227 detachably mounted on a vertical shaft 231, which shafts are synchronously operated as will be described.

The transfer member 226 is designed to take a bottle presented to it by the conveyor 225 after said bottle has been released by the stop and detector mechanism, and push the bottle from said conveyor onto one of the platform elevators 36 during rotation of the latter with the turret. At the time of said transfer of the bottle, the upper surface of the platform elevator is at a level with the conveyor 225 and a stationary transfer plate 232 is fixed adjacent the conveyor to bridge the gap between said conveyor surface and the surface of the platform elevator in moving thereto as shown in Fig. 28. In a somewhat similar manner, the transfer member 227 engages a bottle as it comes around on the elevator to the discharge position and pushes said bottle in from said elevator back to the discharge end of the conveyor as shown in Figs. 32 and 33. A stationary transfer plate 233 is also fixed at said discharge part of the conveyor to bridge the gap between the elevator and conveyor as the former passes this discharge station. A double crescent guide piece 234, preferably of integral construction, is detachably mounted between the transfer members on vertical stationary pins 235 and 236 of the main frame. This guide piece is formed with a crescent guide surface 237 to cooperate with transfer member 226 in guiding the bottle onto the elevator and is also formed with a similar crescent guide surface 238 to cooperate with the discharge transfer member 227 in guiding the bottle off an elevator back onto the conveyor (see Fig. 27).

The bottle stop and release mechanism, which also serves as a detector mechanism for controlling the web feed depending upon the admission of a bottle to the machine, is mounted adjacent the conveyor at the infeed side thereof and slightly in advance of said transfer member 226 (as shown in Figs. 2, 19 to 26 inclusive). This mechanism comprises a stop lever 239 pivoted at 240 on a stationary part of the frame and said lever has integral with the inner end thereof a projecting shoe or stop piece 241 which is designed to extend part way over the conveyor into the path of bottles coming therealong and stop the progress of the same on said conveyor. It should be here noted that the conveyor is operated continuously during the running of the main machine from its driving motor, as will be hereinafter described, and that said conveyor continues to slide under the bottles when stopped thereon.

Figure 22:
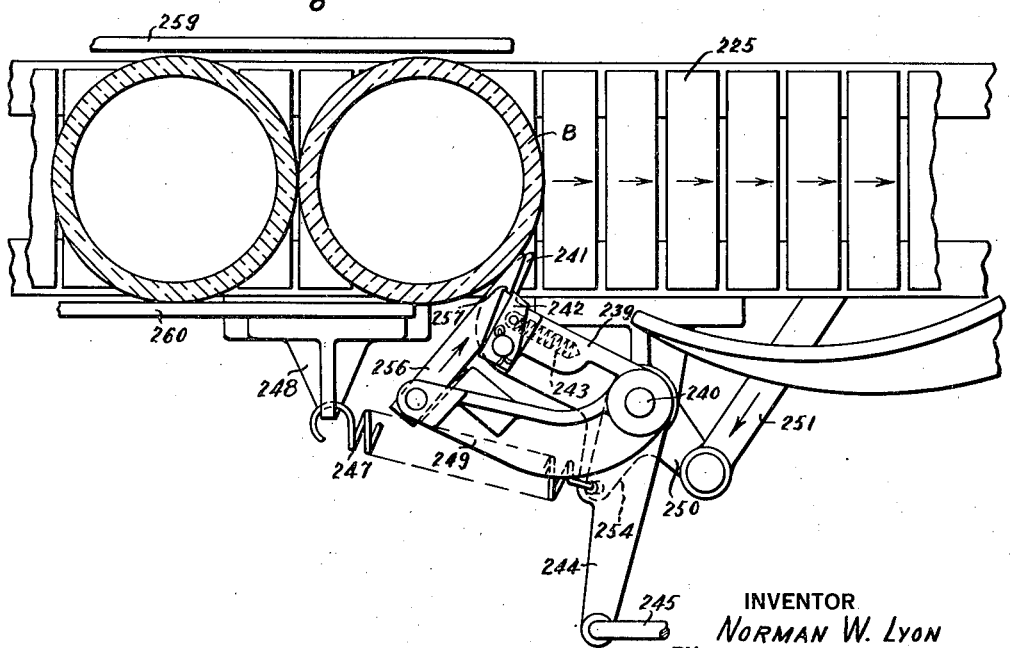

Adjacent the shoe 241 is pivotally mounted on said stop lever a latch 242 which has a limited pivotal movement on said stop lever and is normally held in its projected position by a spring 243 housed in said stop lever (see Fig. 22). Also integral with said stop lever is a link arm 244 connected at its outer end to a link 245, said link being connected at its other end to a crank arm 246 which is journaled in the main frame for keyed connection to the lower end of the vertical trip shaft 223 (see Fig. 4). This trip shaft 223 is carried with lower beam 16 (see Fig. 3) and is vertically slidable with respect to crank arm 246. The upper portion of the trip rod 223 carries fixed thereto the crank arm 222, previously described, for rendering operative or inoperative the web feed clutch (see Figs. 35 and 37). An upper spring 247 is connected between a stationary spring bracket 248 on the main frame and said link arm 244 of the stop lever and tends to hold said stop lever in its inward and stopping position, as shown in Figs. 19 and 20. The outer dotted line position of the crank arm 222 and its roll 127 against the flange 224 of the lower beam 16 furnishes the limiting stop for the inward movement of the shoe 241 on stop lever 239 (see Fig. 37).

When the lever 239 is in its stopping position as shown in Fig. 19, the connecting devices therefrom, just described, maintain crank arm 222, slidable rod 218, and throw-out cam 219 in position, whereby the driving cam for the web feed will be disengaged and the web feed stopped. In order that said crank arm 222 shall be moved in the direction of its arrow (Fig. 37) for shifting the throw-out cam 219 to the right and render the web feed clutch operative, the stop lever 239 must be rocked to its outer non-stopping position (viz. as shown in Fig. 24). It should also be noted that when the stop lever 239 is rocked to its outer non-stopping position, it releases a bottle on the conveyor for entrance into the machine at the same time that it instigates the operation of the web feed clutch, whereby the bottle thus admitted to the machine will have a hood blank presented to it for being hooded thereover at the proper point in the cycle of operations.

Mounted adjacent the stop lever 239 and pivoted on the same pivot stud 240 thereof is a pull-out lever 249. This pull-out lever is arranged to be constantly rocked back and forth and has an integral arm 250 connected by link 251 to a bell crank cam lever 252, one arm of which has a roll 279 riding on cam 253 fixed to the transfer member carrying shaft 230 (see Fig. 25). A second integral arm 254 of said lever 249 is connected by lower spring 255 to the aforesaid stationary spring bracket 248 tending to keep the cam roll 279 of lever 252 against its cam for control thereby. The inner end of said pull-out lever 249 carries pivoted thereon a hook pawl 256 which has a hooked end 257 adapted to engage at certain times with the latch piece 242 of stop lever 239. The hook pawl 256 has a limited pivoted movement on the end of pull-out lever 249 and a spring 258 housed in said lever (see Fig. 24) tends to keep said hook pawl in its projected position (see Figs. 19, 20).

The operation of this stopping, release and detector mechanism may be briefly described as follows. During the operation of the machine with the motor running, the pull-out lever 249 is being constantly rocked back and forth by the rotation of its operating cam 253. Unless a bottle is at stopping position, the oscillation of said pull-out lever 249 will have no effect upon the position of stopping lever 239 and the latter will remain in its inward position, as shown in Fig. 19, under stress of its spring 247. When a bottle on the conveyor eventually comes up against the stop piece 241 (as shown in Fig. 20) it is held thereby from further progress with the conveyor. If, at the time the bottle comes to said stopping position, the hook pawl 256 happens to be in its inward position (as shown in Fig. 19), the pressure of the stopped bottle against the hook pawl will latch the hooked end 257 of said pawl over the latch piece 242 of the stop lever 239. The subsequent outward rocking of said pull-out lever 249 will withdraw the stop lever 239 from its stopping position and will release the bottle for continued progress on the conveyor whereby it will be taken up by the transfer member 226 and pushed onto an elevator which will be coming around to receive it. This outward movement of the stop lever 239 also renders the web feed clutch operative as heretofore described and consequently a hood blank will be properly presented for being hooded on the bottle as it progresses through the machine, all as heretofore described.

When the stop lever 239 is pulled outward it remains latched to the pull-out lever 249 until they both return to their inward position due to tension of spring 247 and the undercut hook engagement between hook 257 and latch 242. The inward movement of lever 249, however, has a slight overthrow with respect to lever 239, the stopping abutment at flange 224 acting to limit the inward throw of the latter, whereby at the inward position of both levers the hook pawl 256 may then disengage from the latch 242 and a subsequent outward movement of said lever 249 will not carry the stop lever 239 therewith unless a bottle is present on the conveyor and in position to press against the hook pawl 256 and engage it with the latch 242 in the manner shown in Figs. 25 and 26.

The timed operation of the parts is so arranged that with bottles coming along the conveyor in an abutting continuous line the hook pawl 256 and stop shoe 241 will oscillate together in and out from between the bottles. When they come to their inward position (as shown in Fig. 25) there occurs a short dwell due to the formation of cam 253 and the next bottle will be stopped by the piece 241 and its pressure will latch pawl 256 upon latch piece 242 (as indicated in Fig. 26) for the next outward movement of said levers 239 and 249. The bottles are thereby stopped and spaced on the conveyor 225 for being properly taken care of by the transfer member 226.

Figure 21:
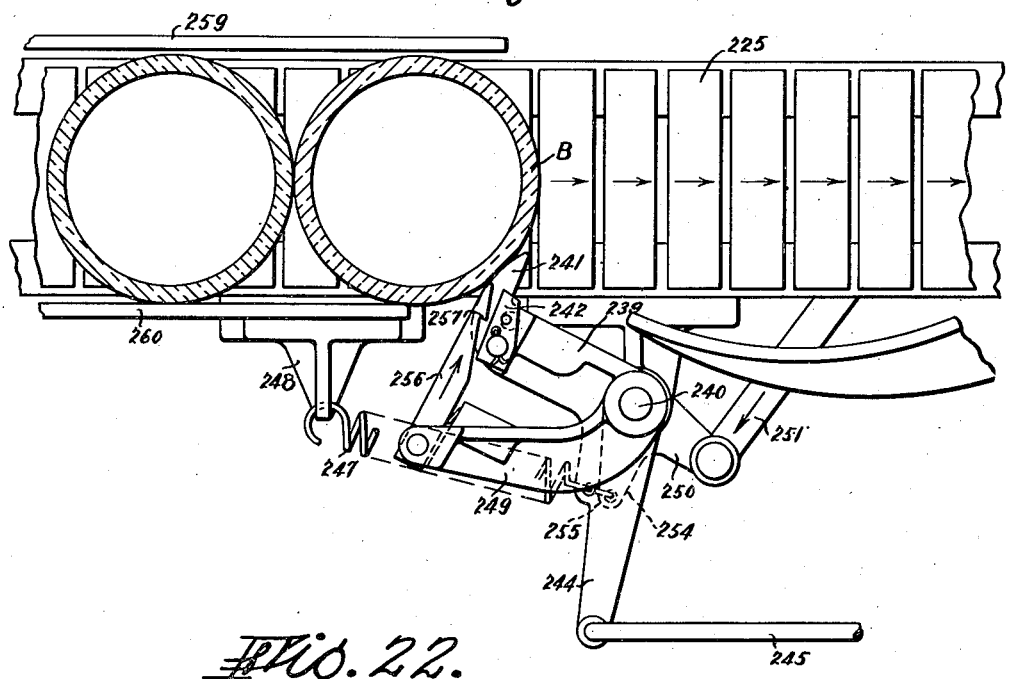

In the event that the bottles are somewhat irregularly spaced on the conveyor 225 and a bottle should thereby come to rest against the stop shoe 241 when the hook pawl 256 is in its outward position (as shown in Fig. 20) the subsequent inward movement of said hook pawl 256 will then force the hooked end of the same between the bottle and the latch piece 242 as shown in Figs. 21 and 22. In order to prevent this inward forcing or crowding of the hook pawl 256 from tending to push back the bottle on the conveyor (which might result in a breakage if a long line of bottles had to be pushed back on the conveyor) the latch piece 242 is yieldably and pivotally mounted on its stop lever 239 as described. In this manner, the inward crowding of the hook pawl 256 will merely push back said latch piece 242 until the hooked end 257 of said pawl can engage over the latch piece.

The conveyor 225 is suitably provided at portions along its length with side rails 259 and 260 for properly guiding said bottles in their travel along the conveyor and for holding said bottles on said conveyor when stopped from progress therewith in the manner above described.

Referring to Figs. 4 and 27, driving means for operating the machine and the conveyor will be described. On the upper end of the main drive shaft 8, which extends upwardly from the reduction gear box 7, is fixed a driving sprocket 261 which operates a driving chain 262. This driving chain (as indicated by dotted line in Fig. 27) is led from the driving sprocket 261 partially around the circumference of a driven sprocket 263 which is fixed to the lower part of the rotatable turret shaft 27, then around a sprocket 264 which is fixed to the lower end of the transfer shaft 231 which carries the discharge transfer member 227 and thence around sprocket 265 which is fixed to the lower end of the transfer shaft 230 which carries the infeed transfer member 226 and thence back to the driving sprocket 261. In this manner the turret is rotated and infeed and outfeed transfer members are rotated from the main driving motor.

Referring to Fig. 2, there is arranged from the lower portion of the transfer shaft 231 a gear train transmission (indicated generally at 266) to a horizontal drive shaft 267 for operating the conveyor. The outer end of said drive shaft 267 carries a drive sprocket 268 (see Fig. 1), which, by means of chain 269, drives a sprocket 270 fixed on the conveyor end shaft 271. The conveyor 225 is of the endless chain type with cross slats, the chain passing over suitable sprockets on end shafts 271 and 272, which shafts are mounted in suitable bearings in the main frame. An idler sprocket 273 journaled on said main frame is provided for supporting the lower run of the conveyor. The upper run of the conveyor is guided on suitable runways so as to have a flat horizontal travel thereon for supporting the bottles.

At the upper end of the carrier frame 15 a housing 274 is provided within which may be placed a transformer and suitable electrical distributing devices (not shown) for the supply of current to the machine in heating the cartridges for the applicator fingers. The electrical system for said heating is fully described in my previous application Serial No. 120,513, and in the present machine said system is in effect duplicated for each applicator mechanism, whereby each of said applicator mechanisms controls its utilization of electrical energy independently of the other. The main collecting ring for distributing current to the rotating turret is indicated at 275 at the end of upper beam 15 (see Fig. 17), and the separate contact members 276, 277 are mounted on the turret, one for each spindle column. A current carrying cable, not shown, will run from housing 274 to the distributing ring 275, and a separate cable (not shown) will run from each contact member 276 and 277 to the commutator rings 138 for each spindle.

What I claim is:

1. In a bottle hooding machine, a support for a hooded bottle, means for providing a supply of binding tape therefor, tape feeding means operable to project a tape end for engagement with a bottle on the support, an applicator finger rotatably carried around the bottle and operable to draw a length of tape from said supply and wrap said tape around the neck of the hooded bottle, a tape clamp non-rotatable with respect to the bottle and operated to clamp the projected tape end against the bottle while the applicator finger is drawing off and wrapping the tape around the bottle, said tape clamp also being operated to withdraw from said tape end as the applicator finger is completing its rotation, and a second tape clamp located part way around said bottle from the first-named tape clamp, said second tape clamp being operated to clamp said tape against the hooded bottle during the time the applicator finger is completing its rotation and the first-named tape clamp is withdrawn.

2. In a bottle hooding machine, a support for a hooded bottle, means for providing a supply of binding tape therefor, tape feeding means operable to project a tape end for engagement with a bottle on the support, an applicator finger rotatably carried around the bottle and operable to draw a length of tape from said supply and wrap said tape around the neck of the hooded bottle and slightly overlap the ends of said tape, cut off means for said tape, a tape clamp non-rotatable with respect to the bottle and operated to clamp the projected tape end against the bottle while the applicator finger is drawing off and wrapping the tape around the bottle, said tape clamp also being operated to withdraw from said tape end as the applicator finger is over-lapping said tape ends and a second tape clamp located part way around said bottle from the first-named tape clamp, said second tape clamp being operated to clamp said tape against the hooded bottle during the time the applicator finger is overlapping said tape ends and the first-named tape clamp is withdrawn.

3. In a bottle hooding machine, a support for a hooded bottle, means for providing a supply of binding tape therefor, tape feeding means operable to project a tape end for engagement with a bottle on the support, an applicator finger rotatably carried around the bottle and operable to draw a length of tape from said supply and wrap said tape around the neck of the hooded bottle, to tape clamp non-rotatable with respect to the bottle to clamp the projected end of said tape against the hooded bottle, and a second tape clamp also non-rotatable with respect to said bottle and located in advance of said first-named clamp in the circuit around said bottle, means for operating said tape clamps to clamp said tape against the hooded bottle in overlapping succession and to withdraw said clamps at proper times to permit the travel of the rotating applicator finger therepast whereby one of said tape clamps will always be in clamping engagement during the application of the tape to the hooded bottle.

4. In a bottle hooding machine, a support for a bottle, means for applying a hood to a bottle on the support, means for taping said applied hood, an intermittently acting tape feed, a positive drive for said tape feed comprising a toothed pinion driven member and a toothed segment driving member, means for effecting relative rotational travel of said members around a bottle on the support to cause an intermittent driving engagement between said members, the teeth of said member which has the faster travel around the bottle being inclined in the direction of said travel and the teeth of the other member being oppositely inclined.

5. In a bottle hooding machine, a support for a bottle, means for applying a hood to a bottle on the support, means for taping said applied hood, an intermittently acting tape feed, a positive drive for said tape feed comprising a toothed pinion driven member and a toothed segment driving member, means for effecting relative rotational travel of said members around a bottle on the support to cause an intermittent driving engagement between said members, the teeth of said member which has the faster travel around the bottle being inclined in the direction of said travel and the teeth of the other member being oppositely inclined, and spring means for yieldingly meshing said teeth when said members come into engagement.

6. In a bottle hooding machine, a support for a bottle, means applying a hood to a bottle on the support, a carrier rotating around said bottle, hood taping means mounted on said carrier, an intermittently acting tape feed on said carrier, a positive drive for said tape feed comprising a toothed pinion driven member journaled on said carrier, a second carrier concentric with said first carrier, a toothed segment driving member mounted on the second carrier for slight radial movement thereon, spring means tending to project said segment member into a path for meshing with said pinion member, means for effecting relative rotation of said carriers around the bottle, the teeth of said member which has the faster rotative travel around the bottle being inclined in the direction of said travel and the teeth of the other member being oppositely inclined.

7. In a bottle hooding machine, a main frame comprising vertical posts, an adjustable carrier frame slidable vertically on said posts comprising a vertical back and upper and lower horizontally projecting beams, a rotatable turret supported at the outer ends of said beams, a lower portion of said turret carrying therewith a plurality of bottle supports, an upper portion of said turret carrying therewith corresponding headers for applying hoods to bottles on said supports, the lower and upper portions of said turret being in telescoping relation and the upper portion of said turret being carried between the beams of said carrier frame for vertical adjustment with respect to said lower portion of the turret, a pair of vertical lift rods for adjusting said carrier frame vertically, and means for simultaneously operating said lift rods equally.

8. In a bottle hooding machine, a main frame comprising vertical posts, an adjustable carrier frame slidable vertically on said posts comprising a vertical back and upper and lower horizontally projecting beams, a rotatable turret supported at the outer ends of said beams, a lower portion of said turret carrying therewith a plurality of bottle supports, an upper portion of said turret carrying therewith corresponding headers for applying hoods to bottles on said support, the lower and upper portions of said turret being in telescoping relation and the upper portion of said turret being carried between the beams of said carrier frame for vertical adjustment with respect to said lower portion of the turret, a pair of vertical lift rods for adjusting said carrier frame vertically, means for simultaneously operating said lift rods equally, the thrust of one of said lift rods being in line with the back of said carrier frame and the thrust of the other lift rod being in line with the outer ends of said beams, said latter lift rod extending axially through said turret.

9. In a bottle hooding machine, a main frame comprising vertical posts, an adjustable carrier frame slidable vertically on said posts comprising a vertical back and upper and lower horizontally projecting beams, a rotatable turret supported at the outer ends of said beams, a lower portion of said turret carrying therewith a plurality of bottle supports, an upper portion of said turret carrying therewith corresponding headers for applying hoods to bottles on said supports, said upper portion of said turret also carrying therewith a plurality of individually rotating spindle columns each having associated therewith tape applicator mechanism for taping the hoods on said bottles, the lower and upper portions of said turret being in telescoping relation and the upper portion of said turret being carried between the beams of said carrier frame for vertical adjustment with respect to said lower portion of the turret, a pair of vertical lift rods for adjusting said carrier frame vertically, and means for simultaneously operating said lift rods equally.

10. In a machine for operating on containers, a conveyer to feed containers to said machine, means for releasing said containers singly, each in timed relation to a cyclic operation of said machine, said means comprising a stop member movable in and out of stopping position with respect to said containers as fed by said conveyer, means tending to normally hold said stop member in its stopping position, a withdrawing member having a periodic movement in and out of a connectable position with respect to said stop member, and means for connecting said withdrawing member to said stop member for withdrawing the latter, the action of said connecting means being determined by the presence of a container at said stop member.

11. In a machine for operating on containers, a conveyer to feed containers to said machine, means for releasing said containers singly, each in timed relation to a cyclic operation of said machine, said means comprising a stop member movable in and out of stopping position with respect to said containers as fed by said conveyer, means tending to normally hold said stop member in its stopping position, a withdrawing member having a periodic movement in and out of a connectable position with respect to said stop member, means for connecting said withdrawing member to said stop member for withdrawing the latter, the action of said connecting means being determined by the presence of a container at said stop member, web feeding means comprising a continuously operated driving means and a clutch throw-out, and connecting devices between said stop member and said clutch throw-out to make the operation of said web feed driving means dependent upon the out position of said stop member.

12. In a machine for operating on containers, a conveyer to feed containers to said machine, means for releasing said containers singly, each in timed relation to a cyclic operation of said machine, said means comprising a stop member movable in and out of stopping position with respect to said containers as fed by said conveyer, means tending to normally hold said stop member in its stopping position, a withdrawing member having a periodic movement in and out of a connectable position with respect to said stop member, means for connecting said withdrawing member to said stop member for withdrawing the latter, said connecting means comprising a yieldably mounted latch piece on said withdrawing member and a yieldably mounted latch piece on said stop member, said latch pieces adapted to be pressed into connection by a container at said stop member.

13. In a machine for operating on containers, a conveyer to feed containers to said machine, means for releasing said containers singly, each in timed relation to a cyclic operation of said machine, said means comprising a stop member movable in and out of stopping position with respect to said containers as fed by said conveyer, means tending to normally hold said stop member in its stopping position, a withdrawing member having a periodic movement in and out of a connectable position with respect to said stop member, a spring pressed pawl on said withdrawing member and a spring-pressed keeper on said stop member arranged so that when said pawl is in connectable position a container arriving at said stop member will press the pawl into connection with said keeper and when the pawl is moving into connectable position against a container at said stop member both pawl and keeper will yield for making connection without displacing said container.

14. In a bottle hooding machine, a bottle support, a hood applying header, a rotatable spindle and tape applying means carried on said spindle for rotation around a bottle on said support, a reciprocable plunger in said spindle adapted to meet the top of a hooded bottle on the support and hold the hood thereon during the operation of said tape applying means, driving means for rotating said spindle and means controlled by said plunger when failing to meet a bottle on the support to render said driving means ineffective for rotation of said spindle, said plunger controlled means comprising clutch members normally tending to be engaged by a spring, a throw-out member for disengaging said clutch members and controlled in its position by said plunger, and a check stop device to limit the rebound stopping position of said spindle when the clutch members are disengaged.

15. In a bottle hooding machine, a bottle support, a hood applying header, a rotatable spindle and tape applying means carried on said spindle for rotation around a bottle on said support, a reciprocable plunger in said spindle adapted to meet the top of a hooded bottle on the support and hold the hood thereon during the operation of said tape applying means, driving means for rotating said spindle and means controlled by said plunger when failing to meet a bottle on the support to render said driving means ineffective for rotation of said spindle, said plunger controlled means comprising a clutch member connected with said driving means, a cooperating clutch member connected with said spindle and including a spring pressed pawl normally tending to engage said first named clutch member, a throw-out member for disengaging said pawl and controlled in its position by said plunger, and a check stop device to limit the rebound stopping position of said second-named clutch member when its pawl is disengaged from said first-named clutch member.

16. In a bottle hooding machine, a rotatable turret carrying therewith bottle supports and cooperating headers for applying hoods to said bottles, web feeding mechanism located at a station past which said headers travel in the rotation of said turret, said web feeding mechanism being operable to extend a hood blank across the path of said traveling headers, movable fingers carried with each header and means to operate said fingers to clasp an extended hood blank against the header during its travel past the station of said web feeding mechanism.

17. In a bottle hooding machine, a rotatable turret carrying therewith bottle supports and cooperating headers for applying hoods to said bottles, web feeding mechanism comprising means to provide a supply of hood material located at a station past which said headers travel in the rotation of said turret, said web feeding mechanism being operable to extend a hood blank across the path of said traveling headers, movable fingers carried with each header and means to operate said fingers to clasp an extended hood blank against the header during its travel past the station of said web feeding mechanism, and hood blank cut off means operable contemporaneously with the clasping of said hood blank on the header.

18. In a bottle hooding machine, a rotatable turret carrying therewith bottle supports and cooperating headers for applying hoods to said bottles, web feeding mechanism located at a station past which said headers travel in the rotation of said turret, said web feeding mechanism being operable to extend a hood blank across the path of said traveling headers, a stationary support for said extended hood blank, movable fingers carried with each header and means to operate said fingers to clasp an extended hood blank against the header during its travel past the station of said web feeding mechanism.

19. In a bottle hooding machine, a rotatable turret carrying therewith bottle supports and cooperating headers for applying hoods to said bottles, said headers being each provided with an opening through which a bottle moves in having a hood applied thereto, web feeding mechanism located at a station past which said headers travel in the rotation of said turret, said web feeding mechanism being operable to extend a hood blank across the path of said traveling headers, movable fingers carried with each header, one finger at each side of the header opening and means to operate said fingers to hold them in open position as the header approaches an extended hood blank and to close said fingers for clasping the hood blank against the header during its travel past the station of said web feeding mechanism.

20. In a bottle hooding machine, a rotatable turret carrying therewith bottle supports and cooperating headers for applying hoods to said bottles, said headers being each provided with an opening through which a bottle is pushed in applying the hood thereto, web feeding mechanism comprising means to provide a supply of hood material located at a station past which said headers travel in the rotation of said turret, said web feeding mechanism being operable to extend a hood blank across the path of said traveling headers, movable fingers carried with each header, one finger at each side of the header opening and means to operate said fingers to hold them in open position as the header approaches an extended hood blank and to close said fingers for clasping the hood blank against the header during its travel past the station of said web feeding mechanism, and hood blank cut-off means operable contemporaneously with the clasping of said hood blank on the header.

21. In a bottle hooding machine, a main frame, a bottle support in the main frame, an adjustable carrier slidably mounted on the main frame for vertical adjustment relative to the bottle support, a hood applying header and a rotatable spindle supported on the carrier frame, tape applying means carried on the spindle and adapted, on rotation of the spindle to apply tape around the neck of a hooded bottle supported in the hood applying header, a reciprocable plunger in said spindle, an adjustable stop to limit the motion of the plunger in one direction of reciprocation, said plunger being adapted to meet the top of a bottle supported in said header by the bottle support and hold the hood thereon during the operation of the tape applying means with the plunger abutting the stop, driving means for rotating said spindle and means controlled by said plunger when failing to meet a bottle on its support to render said driving means ineffective for rotation of said spindle.

NORMAN W. LYON.